US012578696B2

(12) United States Patent
Ramanasankaran et al.

(10) Patent No.: US 12,578,696 B2
(45) Date of Patent: Mar. 17, 2026

(54) BUILDING DATA PLATFORM WITH ARTIFICIAL INTELLIGENCE SERVICE REQUIREMENT ANALYSIS

(71) Applicant: Tyco Fire & Security GmbH, Neuhausen am Rheinfall (CH)

(72) Inventors: Rajiv Ramanasankaran, San Jose, CA (US); Michael J. Risbeck, Madison, WI (US); Chenlu Zhang, Milwaukee, WI (US); Ambuj Shatdal, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 461 days.

(21) Appl. No.: 17/987,652

(22) Filed: Nov. 15, 2022

(65) Prior Publication Data
US 2023/0152762 A1     May 18, 2023

Related U.S. Application Data

(60) Provisional application No. 63/279,759, filed on Nov. 16, 2021.

(51) Int. Cl.
| | |
|---|---|
| *G05B 15/02* | (2006.01) |
| *G05B 23/02* | (2006.01) |
| *G06N 20/00* | (2019.01) |

(52) U.S. Cl.
CPC ......... *G05B 15/02* (2013.01); *G05B 23/0283* (2013.01); *G06N 20/00* (2019.01)

(58) Field of Classification Search
CPC ................ G05B 15/02; G05B 23/0283; G05B 2219/25011; G06N 20/00; G06N 5/022
See application file for complete search history.

(56) References Cited

U.S. PATENT DOCUMENTS

| | | | |
|---|---|---|---|
| 5,301,109 A | 4/1994 | Landauer et al. | |
| 5,446,677 A | 8/1995 | Jensen et al. | |

(Continued)

FOREIGN PATENT DOCUMENTS

| | | |
|---|---|---|
| AU | 2019226217 A1 | 11/2020 |
| AU | 2019226264 A1 | 11/2020 |

(Continued)

OTHER PUBLICATIONS

Balaji et al, "Brick: Metadata schema for portable smart building applications," Applied Energy, 2018 (20 pages).

(Continued)

*Primary Examiner* — Charles R Kasenge
(74) *Attorney, Agent, or Firm* — Foley & Lardner LLP

(57) ABSTRACT

A building system can operate to receive a requirement to implement an artificial intelligence (AI) service. The requirement can include an indication of a type of an entity, wherein the AI service is configured to generate an analytic for the entity of the type of the entity or a control setting for the entity of the type of the entity. The requirement can include a data element that the AI service is configured to operate on to generate the analytic or the control setting. The building system can operate to determine that the building system meets the requirement to implement the AI service responsive to a determination that a digital twin of the building system includes the entity of the entity type and the data element and implement the AI service responsive to a determination that the building system meets the requirement.

17 Claims, 13 Drawing Sheets

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,297 | B2 | 1/2019 | Stewart et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,564,993 | B2 | 2/2020 | Deutsch et al. |
| 10,705,492 | B2 | 7/2020 | Harvey |
| 10,708,078 | B2 | 7/2020 | Harvey |
| 10,760,815 | B2 | 9/2020 | Janakiraman et al. |
| 10,762,475 | B2 | 9/2020 | Song et al. |
| 10,824,120 | B2 | 11/2020 | Ahmed |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,041,650 | B2 | 6/2021 | Li et al. |
| 11,054,796 | B2 | 7/2021 | Holaso |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 11,556,105 | B2 | 1/2023 | Cooley et al. |
| 11,561,522 | B2 | 1/2023 | Cooley et al. |
| 11,561,523 | B2 | 1/2023 | Cooley et al. |
| 11,573,551 | B2 | 2/2023 | Cooley et al. |
| 11,586,167 | B2 | 2/2023 | Cooley et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2007/0273610 | A1 | 11/2007 | Baillot |
| 2008/0034425 | A1 | 2/2008 | Overcash et al. |
| 2008/0094230 | A1 | 4/2008 | Mock et al. |
| 2008/0097816 | A1 | 4/2008 | Freire et al. |

(56)                References Cited

U.S. PATENT DOCUMENTS

| | | |
|---|---|---|
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |

(56) References Cited

U.S. PATENT DOCUMENTS

| | | |
|---|---|---|
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gaertner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0133978 A1 | 4/2020 | Ramamurti et al. |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0104317 A1* | 4/2021 | Warner ............... G06F 9/44526 |
| 2021/0325070 A1 | 10/2021 | Endel et al. |
| 2021/0342961 A1 | 11/2021 | Winter et al. |
| 2021/0373509 A1 | 12/2021 | Borah et al. |
| 2021/0373510 A1 | 12/2021 | Borah et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0027529 A1* | 1/2022 | Zarur ..................... G06F 30/12 |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

(56) References Cited

FOREIGN PATENT DOCUMENTS

OTHER PUBLICATIONS

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema for Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Chinese Office Action on CN Appl. No. 201780003995.9 dated Apr. 8, 2021 (21 pages with English language translation).

Chinese Office action on CN Appl. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

Digital Platform Litigation Documents Part 10, includes DDE-1-21-cv-01796 (documents filed Nov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

Driscoll, Mike, "Jupyter Notebook: an Introduction," URL:https://realpython.com/jupyter-notebook-introduction/, retrieved from internet Feb. 7, 2023 (13 pages).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick," BuildSys '19, New York, NY, USA, Nov. 13-14, 2019 (10 pages).

Fierro et al., "Dataset: an Open Dataset and Collection Tool for BMS Point Labels," Data'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: an Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).

File History for U.S. Appl. No. 12/776,159, filed May 7, 2010 (722 pages).

Final Conference Program, ACM BuildSys 2016, Stanford, Ca, USA, Nov. 15-17, 2016 (7 pages).

Gao et al., "A large-scale evaluation of automated metadata inference approaches on sensors from air handling units," Advanced Engineering Informatics, 2018, 37 (pp. 14-30).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: the Digital Twin Standard for Buildings," URL: https://www.automatedbuildings.com/news/feb21/articles/passivelogic/210127124501passivelogic.html, Feb. 2021 (6 pages).

Hu, S. et al., "Building performance optimisation: a hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

(56)          References Cited

OTHER PUBLICATIONS

International Search Report and Written Opinion on PCT/US2019/ 015481, dated May 17, 2019, 78 pages.

International Search Report and Written Opinion on PCT/US2020/ 058381, dated Jan. 27, 2021, 30 pages.

Japanese Office Action on JP Appl. No. 2018-534963 dated May 11, 2021 (16 pages with English language translation).

Koh et al., "Plaster: an Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," Build-Sys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/ quantum-explorer/, retrieved from internet Jan. 4, 2023 (13 pages).

Passivelogic, "Quantum: the Digital Twin Standard for Autonomous Systems, a physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: a guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs. berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C "SPARQL: Query Language for RDF," located on The Wayback Machine, URL: https://web.archive.org/web/20161230061728/http:// www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Zhou, Q. et al., "Knowledge-infused and Consistent Complex Event Processing over Real-time and Persistent Streams," Further Generation Computer Systems, 2017, 76 (pp. 391-406).

U.S. Appl. No. 17/566,029, Passivelogic, Inc.

U.S. Appl. No. 17/567,275, Passivelogic, Inc.

U.S. Appl. No. 17/722,115, Passivelogic, Inc.

* cited by examiner

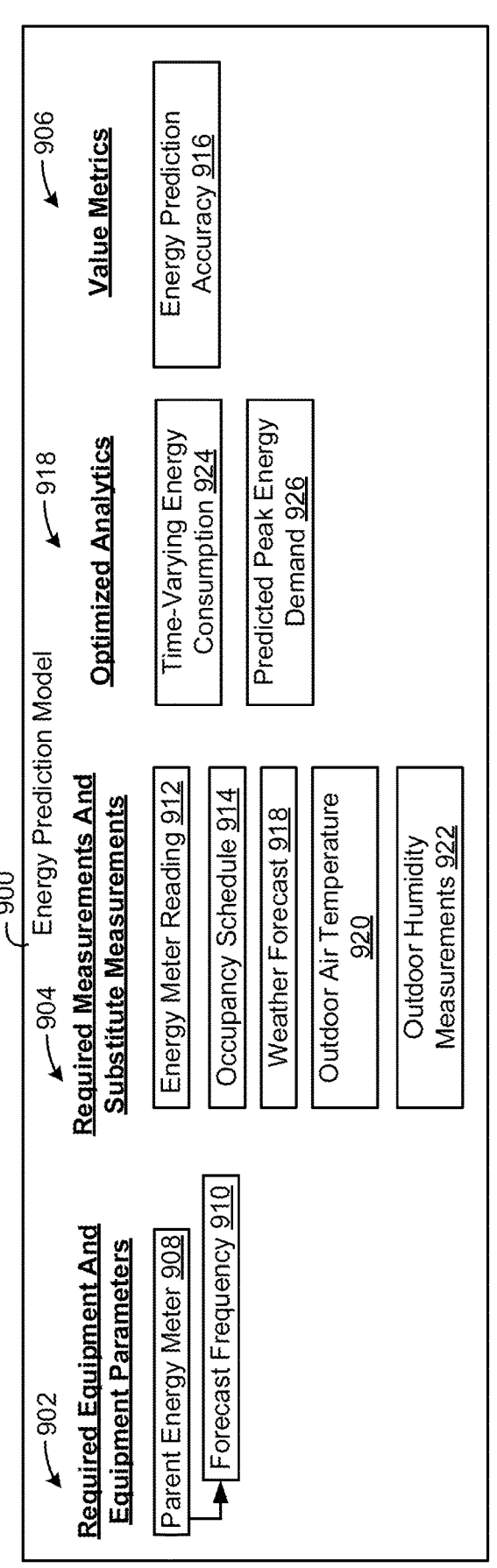

900 Energy Prediction Model

902
Required Equipment And Equipment Parameters

Parent Energy Meter 908

Forecast Frequency 910

904 Required Measurements And Substitute Measurements

Energy Meter Reading 912

Occupancy Schedule 914

Weather Forecast 918

Outdoor Air Temperature 920

Outdoor Humidity Measurements 922

918 Optimized Analytics

Time-Varying Energy Consumption 924

Predicted Peak Energy Demand 926

906 Value Metrics

Energy Prediction Accuracy 916

FIG. 9

BUILDING DATA PLATFORM WITH ARTIFICIAL INTELLIGENCE SERVICE REQUIREMENT ANALYSIS

CROSS-REFERENCE TO RELATED PATENT APPLICATIONS

This application claims the benefit of and priority to U.S. Provisional Patent Application No. 63/279,759 filed Nov. 16, 2021, the entirety of which is incorporated by reference herein.

BACKGROUND

This application relates generally to a building system of a building. This application relates more particularly to artificial intelligence solutions run by the building system.

A building may run various artificial intelligence solutions, e.g., applications, machine learning solutions, artificial intelligence solutions, etc. for managing a building. However, the equipment, layout, and configurations of various buildings may be different and therefore the artificial intelligence solutions may not always be applicable for various buildings. Therefore, it is desirable for a building system to understand which artificial intelligence solutions are appropriate for which buildings. Furthermore, it would be desirable to understand what changes could be made to a building so that an artificial intelligence solution could run for the building.

SUMMARY

One implementation of the present disclosure is a building system of a building including one or more memory devices storing instructions thereon that, when executed by one or more processors, cause the one or more processors to receive a requirement to implement an artificial intelligence (AI) service. The requirement can include an indication of a type of an entity, wherein the AI service is configured to generate an analytic for the entity of the type of the entity or a control setting for the entity of the type of the entity. The requirement can include a data element that the AI service is configured to operate on to generate the analytic or the control setting. The instructions can cause the one or more processors to determine that the building system meets the requirement to implement the AI service responsive to a determination that a digital twin of the building system includes the entity of the entity type and the data element. The instructions can cause the one or more processors to implement the AI service responsive to a determination that the building system meets the requirement.

In some embodiments, the instructions cause the one or more processors to receive an indication of a metric indicating a level of performance of the AI service. In some embodiments, the instructions cause the one or more processors to retrieve the data element from the digital twin and generate a value of the metric indicating the level of performance of the AI service based on the data element.

In some embodiments, the data element including a data value of equipment of the building. In some embodiments, the AI service including a model configured to generate, based on the data value, the analytic for the entity of the type of the entity or the control setting for entity of the type of the entity.

In some embodiments, the instructions cause the one or more processors to determine that the AI service does not meet the requirement, identify one or more equipment updates for the building, the one or more equipment updates including installing equipment in the building, the equipment producing the data element, and generate a recommendation including the one or more equipment updates for the building.

In some embodiments, the instructions cause the one or more processors to receive a second requirement for the AI service, the second requirement indicating one or more child entities dependent on the entity, wherein the entity is a parent entity and determine that the building system meets the second requirement responsive to a determination that the digital twin includes the parent entity and the one or more child entities dependent on the parent entity.

In some embodiments, the data element includes at least one of a characteristic of the entity of the building or a data point of the entity of the building.

In some embodiments, the digital twin is a knowledge graph including nodes representing entities of the building and edges between the nodes indicating relationships between entities of the building. In some embodiments, the instructions cause the one or more processors to determine that the building system meets the requirement to implement the AI service by searching the nodes and the edges to determine that a first node of the nodes represents the entity of the entity type and a second node, related to the first node by an edge of the edges, represents or includes the data element.

In some embodiments, the instructions cause the one or more processors to receive a substitute requirement for the AI service, the substitute requirement indicating one or more data elements that substitute for the data element. In some embodiments, the instructions cause the one or more processors to determine that the digital twin includes the one or more data elements that substitute for the data element and determine that the building system meets the substitute requirement to implement the AI service responsive to a determination that the digital twin of the building system includes the one or more data elements.

In some embodiments, the instructions cause the one or more processors to determine that the building system meets the requirement to implement the AI service by determining that the digital twin includes the one or more data elements that substitute for the data element.

In some embodiments, the instructions cause the one or more processors to determine that the building system meets the requirement to implement the AI service by determining that the data element can be derived from the one or more data elements of the digital twin.

In some embodiments, the instructions cause the one or more processors to determine that the building system meets the substitute requirement to implement the AI service by determining that the data element can be derived from information of another building.

Another implementation of the present disclosure is a method. The method can include receiving, by one or more processing circuits, a requirement to implement an artificial intelligence (AI) service. The requirement can include an indication of a type of an entity of a building, wherein the AI service is configured to generate an analytic for the entity of the type of the entity or a control setting for the entity of the type of the entity and a data element that the AI service is configured to operate on to generate the analytic or the control setting. The method can include determining, by the one or more processing circuits, that the one or more processing circuits meet the requirement to implement the AI service responsive to a determination that a digital twin of the building includes the entity of the entity type and the data element and implementing, by the one or more processing circuits, the AI service responsive to a determination that the one or more processing circuits meet the requirement.

In some embodiments, the data element including a data value of equipment of the building. In some embodiments, the AI service including a model configured to generate, based on the data value, the analytic for the entity of the type of the entity or the control setting for entity of the type of the entity.

In some embodiments, the method includes determining, by the one or more processing circuits, that the AI service does not meet the requirement. In some embodiments, the method includes identifying, by the one or more processing circuits, one or more equipment updates for the building, the one or more equipment updates including installing equipment in the building, the equipment producing the data element and generating, by the one or more processing circuits, a recommendation including the one or more equipment updates for the building.

In some embodiments, the method includes receiving, by the one or more processing circuits, a second requirement for the AI service, the second requirement indicating one or more child entities dependent on the entity, wherein the entity is a parent entity and determining, by the one or more processing circuits, that the one or more processing circuits meet the second requirement responsive to a determination that the digital twin includes the parent entity and the one or more child entities dependent on the parent entity.

In some embodiments, the digital twin is a knowledge graph including nodes representing entities of the building and edges between the nodes indicating relationships between entities of the building. The method can include determining, by the one or more processing circuits, that the one or more processing circuits meet the requirement to implement the AI service by searching the nodes and the edges to determine that a first node of the nodes represents the entity of the entity type and a second node, related to the first node by an edge of the edges, represents or includes the data element.

The method can include receiving, by the one or more processing circuits, a substitute requirement for the AI service, the substitute requirement indicating one or more data elements that substitute for the data element. The method can include determining, by the one or more processing circuits, that the digital twin includes the one or more data elements that substitute for the data element and determining, by the one or more processing circuits, that the one or more processing circuits meet the substitute requirement to implement the AI service responsive to a determination that the digital twin of the building includes the one or more data elements.

Another implementation of the present disclosure includes one or more storage media storing instructions thereon, that, when executed by one or more processors, cause the one or more processors to receive a requirement to implement an artificial intelligence (AI) service. The requirement can include an indication of a type of an entity of a building, wherein the AI service is configured to generate an analytic for the entity of the type of the entity or a control setting for the entity of the type of the entity and a data element that the AI service is configured to operate on to generate the analytic or the control setting. The instructions can cause the one or more processors to determine that the one or more processors meet the requirement to implement the AI service responsive to a determination that a digital twin of the building includes the entity of the entity type and the data element and implement the AI service responsive to a determination that the one or more processors meet the requirement.

In some embodiments, the instructions cause the one or more processors to determine that the AI service does not meet the requirement, identify one or more equipment updates for the building, the one or more equipment updates including installing equipment in the building, the equipment producing the data element, and generate a recommendation including the one or more equipment updates for the building.

In some embodiments, the instructions cause the one or more processors to receive a second requirement for the AI service, the second requirement indicating one or more child entities dependent on the entity, wherein the entity is a parent entity and determine that the one or more processors meet the second requirement responsive to a determination that the digital twin includes the parent entity and the one or more child entities dependent on the parent entity.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 9 is a block diagram of requirements and value metrics of an energy prediction model solution, according to an exemplary embodiment.

DETAILED DESCRIPTION

Figure 1:
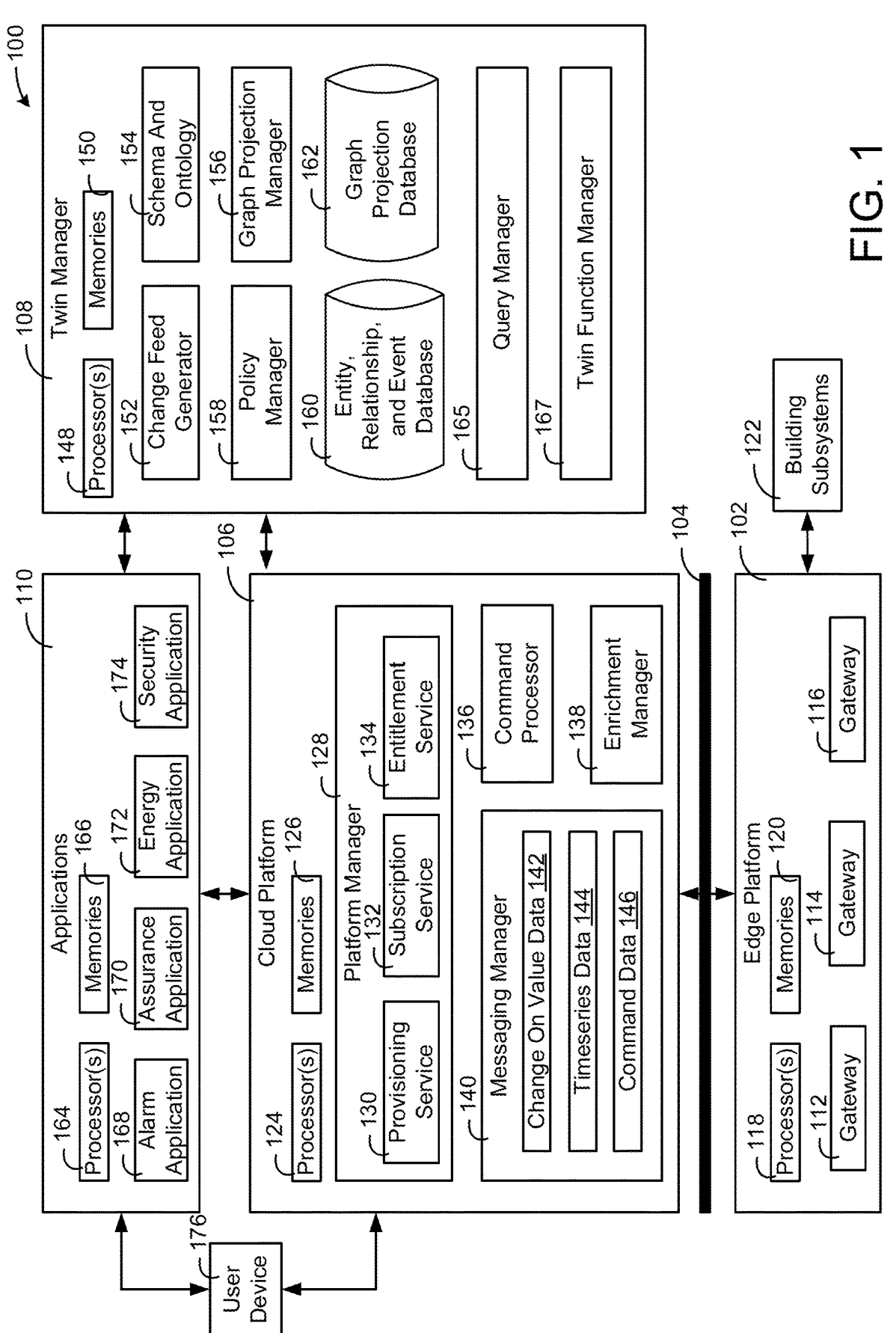
FIG. 1 is a block diagram of a building data platform including an edge platform, a cloud platform, and a twin manager, according to an exemplary embodiment.

Referring generally to the FIGURES, systems and methods for artificial intelligence service requirement analysis is shown, according to various exemplary embodiments. A building system can be configured to model a building with a digital twin. The digital twin, e.g., a knowledge graph, can include certain sets of configurations and/or historical data (e.g., timeseries data). Furthermore, the building system can run various software applications, e.g., artificial intelligence (AI) solutions, machine learning solutions, etc. In some embodiments, the artificial intelligence service discussed herein is a software application, e.g., a building control application and/or analytics application. The artificial intelligence service can improve building performance and/or report on building performance. The artificial intelligence service can address occupant comfort, energy usage, data point predictions, etc.

In some embodiments, the artificial intelligence service may have a minimum or required set of data necessary to run. In some embodiments, the artificial intelligence service, or another data file, can include the sets of requirements necessary for the various artificial intelligence service to run. The data that the artificial intelligence service runs on can be stored in the digital twin. The building system can analyze the requirements of available artificial intelligence services and the available data of the digital twin to determine whether the requirements are met, satisfied, or fulfilled and that a particular artificial intelligence service can run for the building, run on a building system, run against a particular digital twin, etc. In this regard, the building system can fit the data points to the artificial intelligence service instead of fitting the artificial intelligence service to the data.

In some embodiments, the building system runs through multiple different artificial intelligence services to test each of the artificial intelligence services and determine whether each of the artificial intelligence services can be implemented and run, e.g., whether the building system, processors, processing systems, database systems, memory systems meet or satisfy the requirements of the artificial intelligence services. Furthermore, in some embodiments, the building system can quantify a benefit resulting from the implementation of the artificial intelligence services and present only those artificial intelligence services that quantitatively benefit the owner of the built-environment. In some embodiments, responsive to testing all of the artificial intelligence services, the building system can present recommended artificial intelligence services applicable for the building and allow the user to confirm that they want one, some, all, or none of the artificial intelligence services to be implemented and run by the building system.

In some embodiments, the building system can record what pieces of data are missing for each artificial intelligence service. In some embodiments, the building system can identify what software and/or hardware improvements would be necessary for the artificial intelligence service to be implemented. For example, one or more sensors could be installed by a building owner which would allow a particular artificial intelligence service to run. In this regard, the building system could present recommendations to a user indicating that if a particular sensor was installed to gather additional data, or a specific data point (e.g., sensor data point, setpoint, etc.) was stored and trended in a database, one or multiple artificial intelligence services could run.

In some embodiments, the building system can determine whether a data point can be simulated if the data point is missing from the digital twin. For example, if a particular artificial intelligence service requires the data point but the data point does not exist in the digital twin, the building system can simulate the data point from other data points in the digital twin. This can enable the building system to run the particular artificial intelligence service even if the required data is not present.

In some embodiments, after the building system has been running the artificial intelligence services for a particular period of time, the building system can analyze the accuracy and performance of the artificial intelligence services. In some embodiments, the building system can determine whether to stop implementing an artificial intelligence service or implement the output of an artificial intelligence service that is running in the background for testing purposes.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FP-GAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "Device-BadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid"
}
```

An example of an enriched event generated by the enrichment manager 138 may be:

```
{
"id": "someguid",
"eventType": "Device_Heartbeat",
"eventTime": "2018-01-27T00:00:00+00:00"
"eventValue": 1,
"deviceID": "someguid",
"buildingName": "Building-48",
"buildingID": "SomeGuid",
"panelID": "SomeGuid",
"panelName": "Building-48-Panel-13",
"cityID": 371,
"cityName": "Milwaukee",
"stateID": 48,
"stateName": "Wisconsin (WI)",
"countryID": 1,
"country Name": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
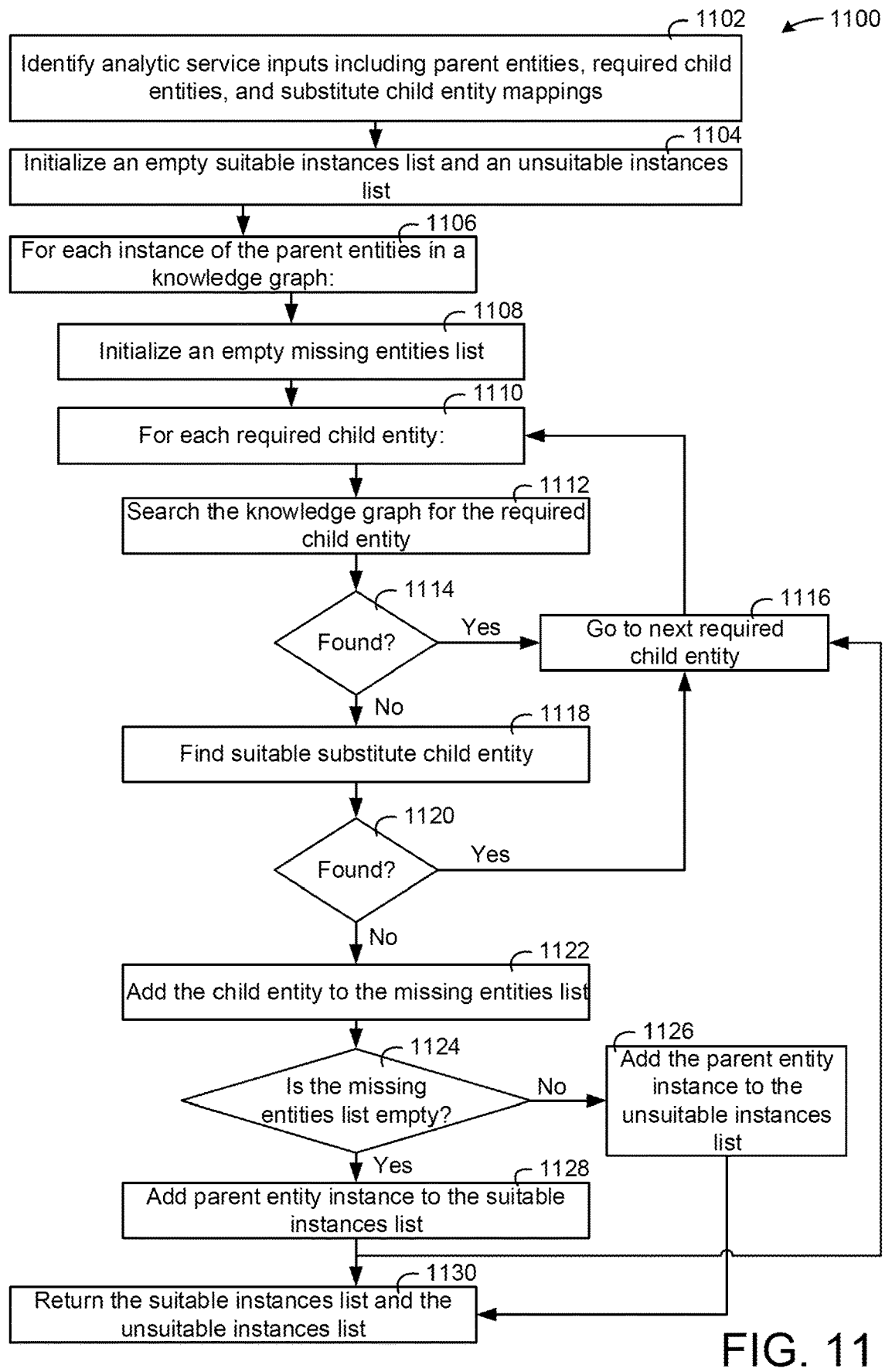
FIG. 11 is a block diagram of a process of checking requirements of an artificial intelligence service against the knowledge graph to determine whether the artificial intelligence service can be implemented for a particular building, according to an exemplary embodiment.
Figure 12:
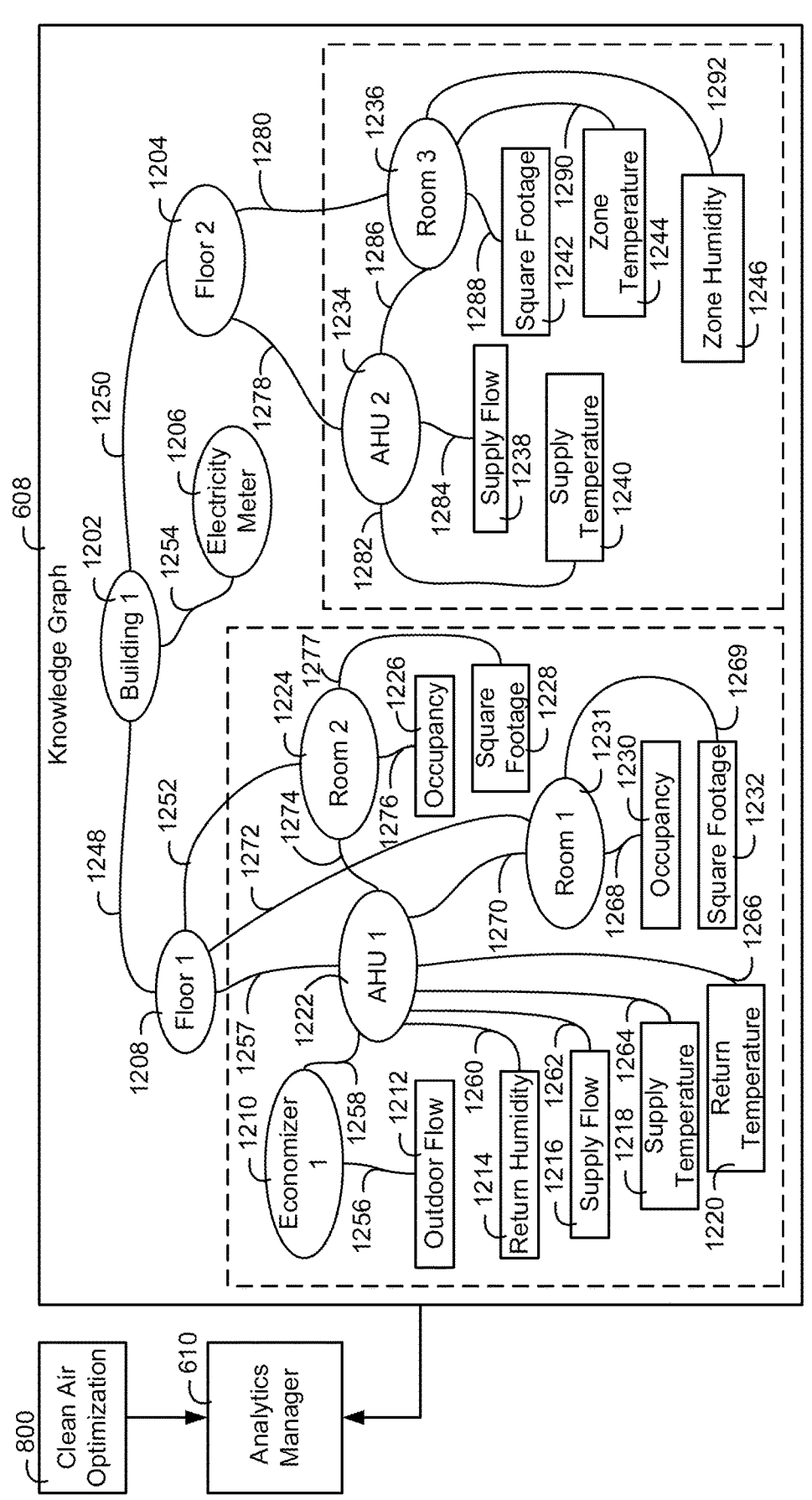
FIG. 12 is a block diagram of the clean air optimization solution being checked against the knowledge graph to determine whether the clean air optimization solution can be implemented, according to an exemplary embodiment.
Figure 13:
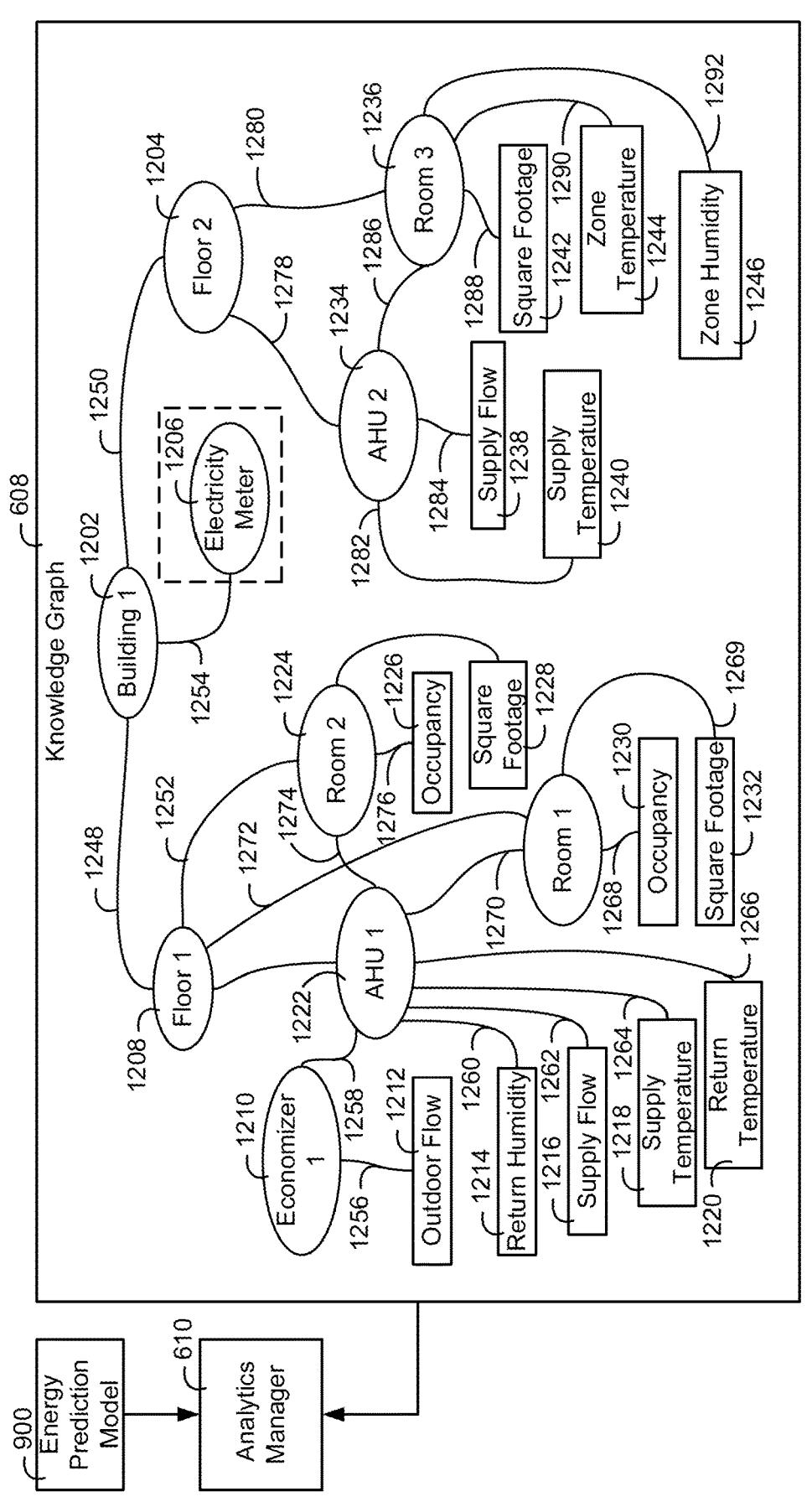
FIG. 13 is a block diagram of the energy prediction modeling solution being checked against the knowledge graph to determine whether the energy prediction modeling solution can be implemented, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions. Subscriptions can be subscriptions of a particular tenant as described in FIG. 24.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can iden-tify a policy for a commanding entity within the graph projection to determine whether the commanding entity has the ability to make the command. For example, the com-mand processor 136, before allowing a user to make a command, determine, based on the graph projection data-base 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more condi-tional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detect-ing a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodi-ments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region←→Building←→Floor←→Space←→Asset

For the ontology of a subscription of "Customer B," the graph projection manager 156 can create relationships based on the rule:

Building←→Floor←→Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply per-missions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
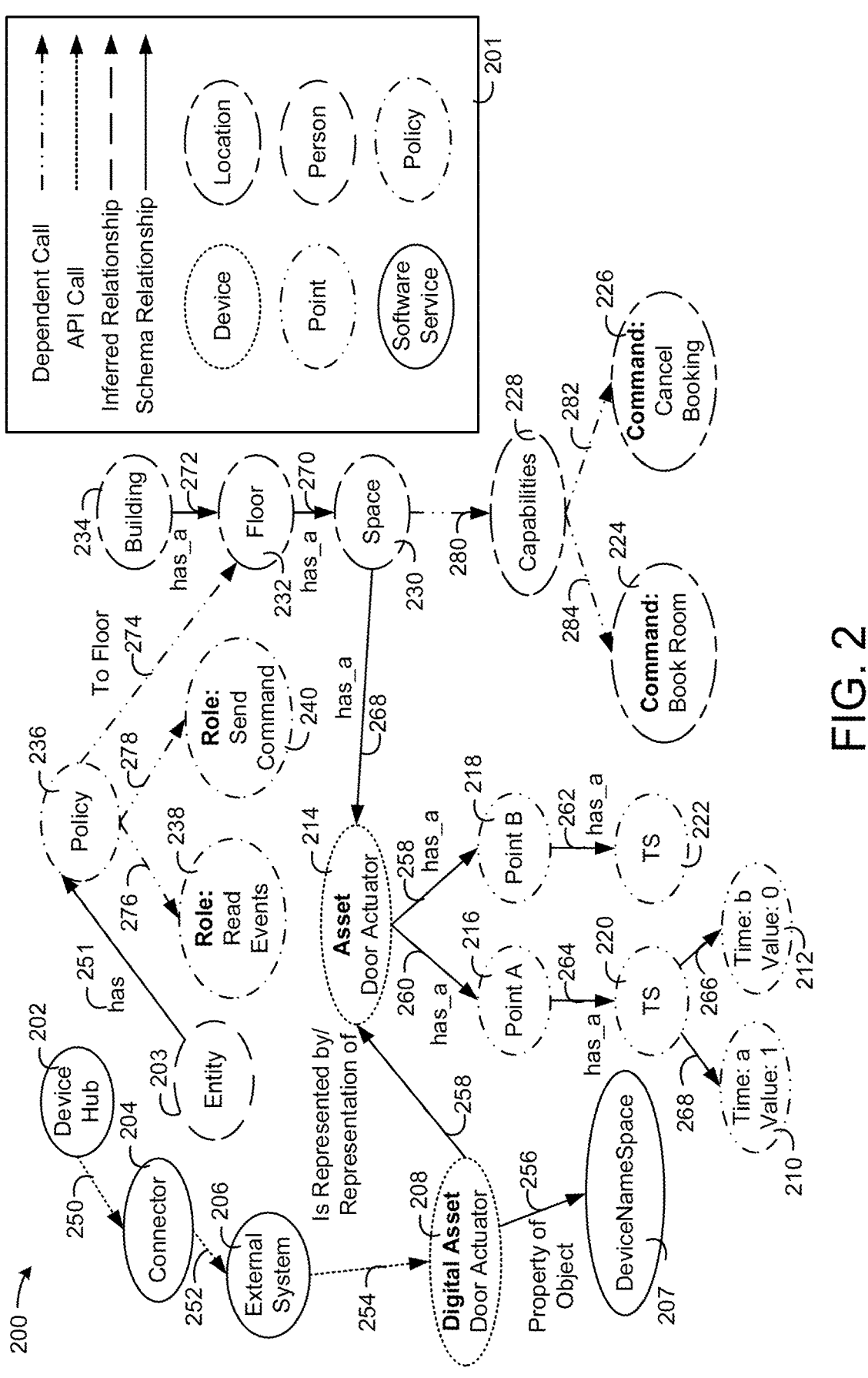
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
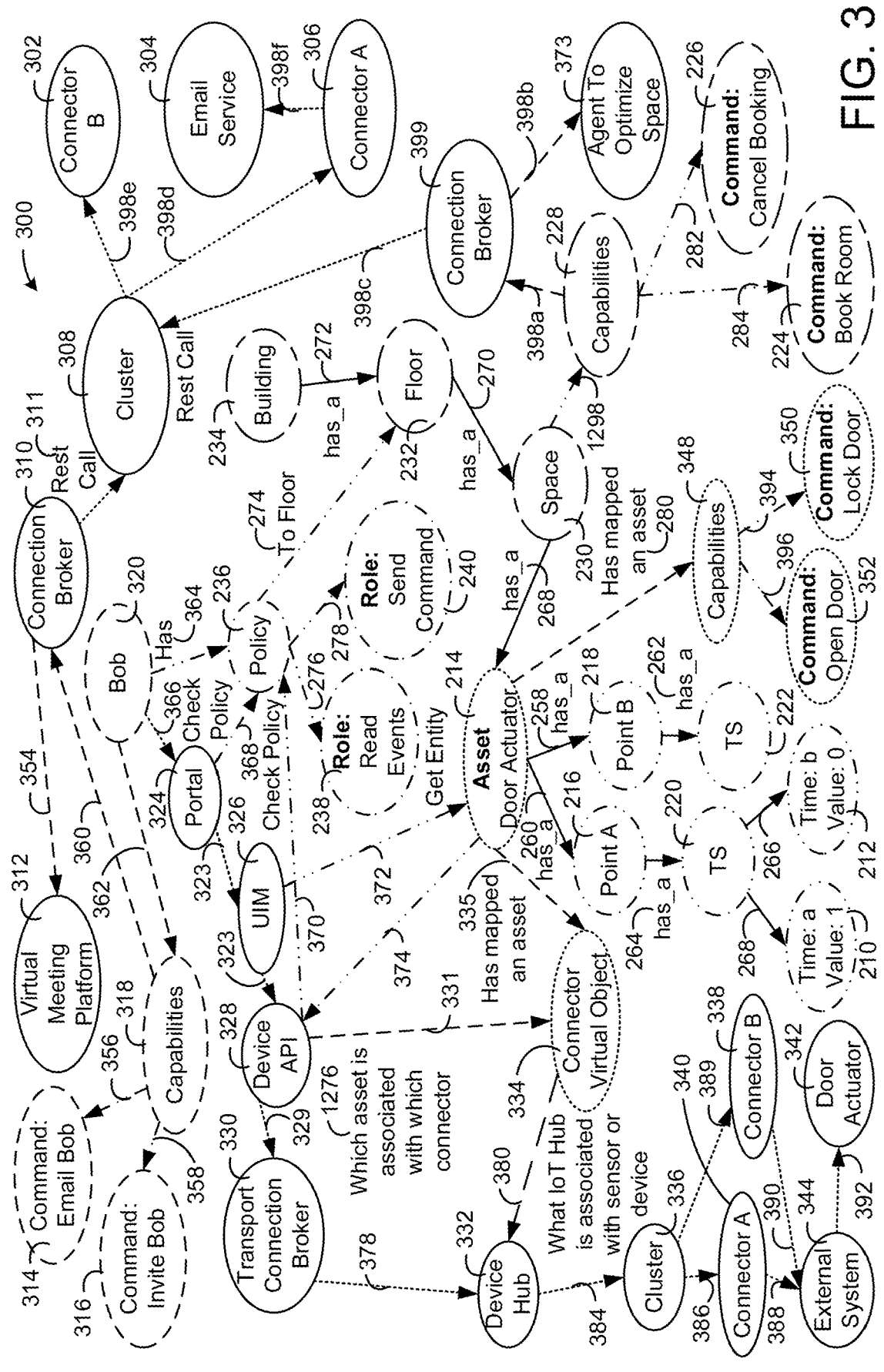
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 399 related to capabilities 228 by edge 398a. The connection broker 399 can be a node representing a software application configured to facilitate a connection with another software application. In some embodiments, the cloud platform 106 can identify the system that implements the capabilities 228 by identifying the edge 398a between the capabilities 228 and the connection broker 399.

The connection broker 399 is related to an agent that optimizes a space 373 via edge 398b. The agent represented by the node 356 can book and cancel bookings for the space represented by the node 230 based on the edge 398*b* between the connection broker 399 and the node 356 and the edge 398*a* between the capabilities 228 and the connection broker 399.

The connection broker 399 is related to a cluster 308 by edge 398*c*. Cluster 308 is related to connector B 302 via edge 398*e* and connector A 306 via edge 398*d*. The connector A 306 is related to an external email service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398*f*. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
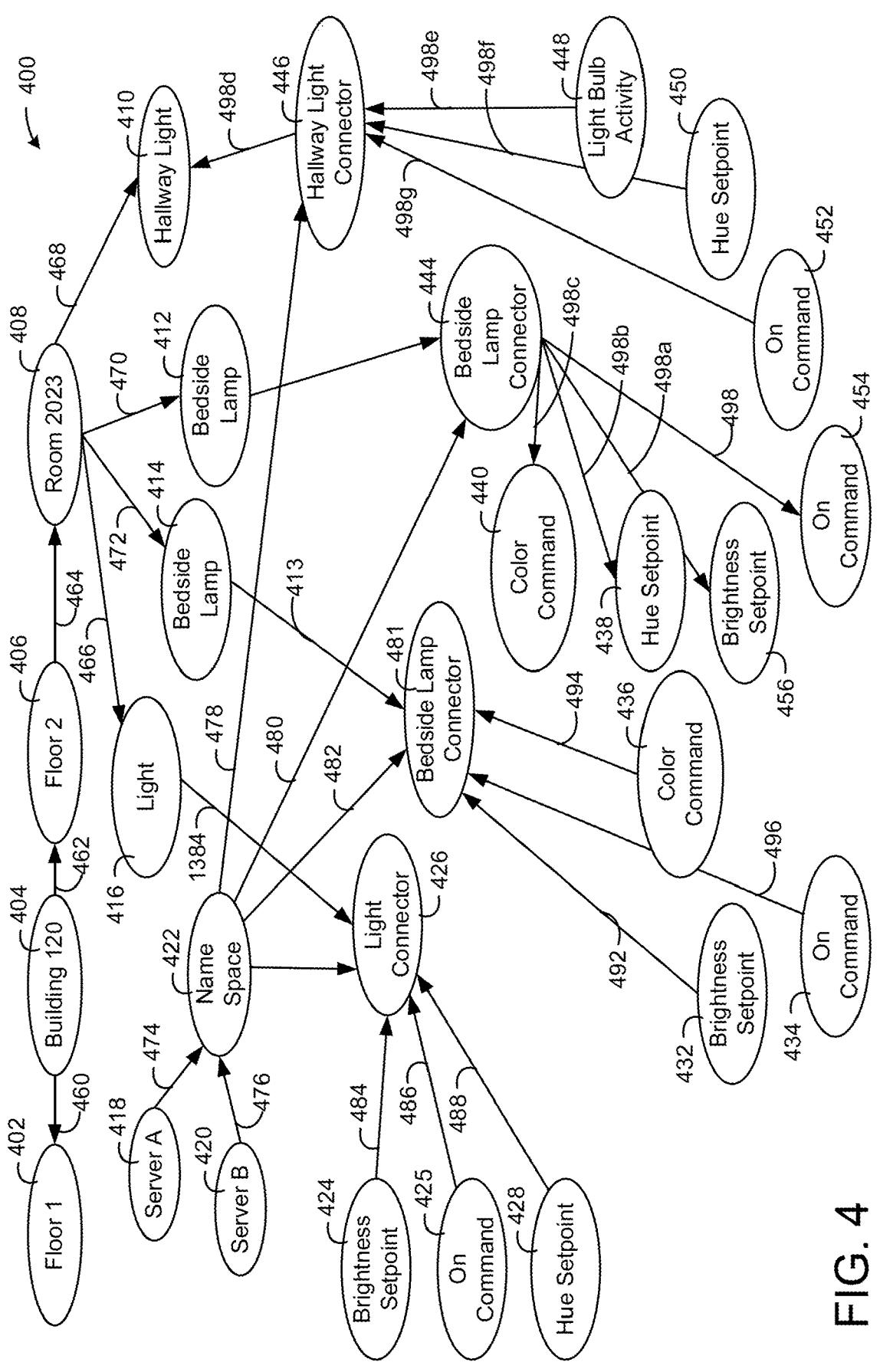
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498*f*. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498*d*. The hallway light connector 446 is linked to multiple commands for the hallway light node 410 via edges 498*g*, 498*f*, and 498*e*. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498*c*, 498*b*, 498*a*, and 498.

Figure 5:
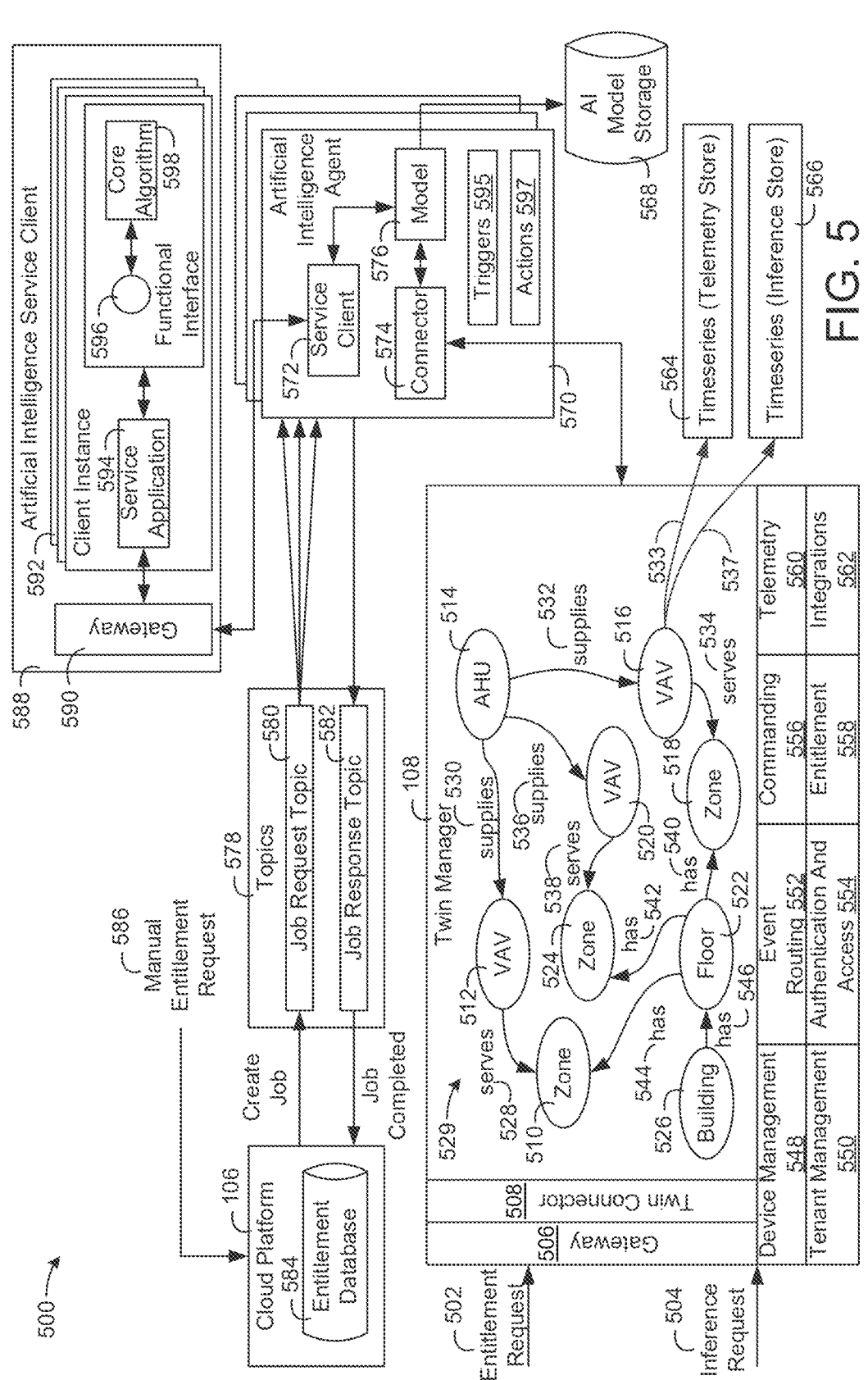
FIG. 5 is a block diagram of a system for managing a digital twin where an artificial intelligence agent can be executed to infer information for an entity of a graph, according to an exemplary embodiment.

Referring now to FIG. 5, a system 500 for managing a digital twin where an artificial intelligence agent can be executed to infer and/or predict information for an entity of a graph is shown, according to an exemplary embodiment. The system 500 can be components of the building data platform 100, e.g., components run on the processors and memories of the edge platform 102, the cloud platform 106, the twin manager 108, and/or the applications 110. The system 500 can, in some implementations, implement a digital twin with artificial intelligence.

A digital twin (or a shadow) may be a computing entity that describes a physical thing (e.g., a building, spaces of a building, devices of a building, people of the building, equipment of the building, etc.) through modeling the physical thing through a set of attributes that define the physical thing. A digital twin can refer to a digital replica of physical assets (a physical device twin) and can be extended to store processes, people, places, systems that can be used for various purposes. The digital twin can include both the ingestion of information and actions learned and executed through artificial intelligence agents.

In FIG. 5, the digital twin can be a graph 529 managed by the twin manager 108 and/or artificial intelligence agents 570. In some embodiments, the digital twin is the combination of the graph 529 with the artificial intelligence agents 570. In some embodiments, the digital twin enables the creation of a chronological time-series database of telemetry events for analytical purposes. In some embodiments, the graph 529 uses the BRICK schema.

The twin manager 108 stores the graph 529 which may be a graph data structure including various nodes and edges interrelating the nodes. The graph 529 may be the same as, or similar to, the graph projections described herein with reference to FIGS. 1-4. The graph 529 includes nodes 510-526 and edges 528-546. The graph 529 includes a building node 526 representing a building that has a floor indicated by the "has" edge 546 to the floor node 522. The floor node 522 is relate to a zone node 510 via a "has" edge 544 indicating that the floor represented by the node 522 has a zone represented by the zone node 510.

The floor node 522 is related to the zone node 518 by the "has" edge 540 indicating that the floor represented by the floor node 522 has another zone represented by the zone node 518. The floor node 522 is related to another zone node 524 via a "has" edge 542 representing that the floor represented by the floor node 522 has a third zone represented by the zone node 524.

The graph 529 includes an AHU node 514 representing an AHU of the building represented by the building node 526. The AHU node 514 is related by a "supplies" edge 530 to the VAV node 512 to represent that the AHU represented by the AHU node 514 supplies air to the VAV represented by the VAV node 512. The AHU node 514 is related by a "supplies" edge 536 to the VAV node 520 to represent that the AHU represented by the AHU node 514 supplies air to the VAV represented by the VAV node 520. The AHU node 514 is related by a "supplies" edge 532 to the VAV node 516 to represent that the AHU represented by the AHU node 514 supplies air to the VAV represented by the VAV node 516.

The VAV node 516 is related to the zone node 518 via the "serves" edge 534 to represent that the VAV represented by the VAV node 516 serves (e.g., heats or cools) the zone represented by the zone node 518. The VAV node 520 is related to the zone node 524 via the "serves" edge 538 to represent that the VAV represented by the VAV node 520 serves (e.g., heats or cools) the zone represented by the zone node 524. The VAV node 512 is related to the zone node 510 via the "serves" edge 528 to represent that the VAV represented by the VAV node 512 serves (e.g., heats or cools) the zone represented by the zone node 510.

Furthermore, the graph 529 includes an edge 533 related to a timeseries node 564. The timeseries node 564 can be information stored within the graph 529 and/or can be information stored outside the graph 529 in a different database (e.g., a timeseries database). In some embodiments, the timeseries node 564 stores timeseries data (or any other type of data) for a data point of the VAV represented by the VAV node 516. The data of the timeseries node 564 can be aggregated and/or collected telemetry data of the timeseries node 564.

Furthermore, the graph 529 includes an edge 537 related to a timeseries node 566. The timeseries node 566 can be information stored within the graph 529 and/or can be information stored outside the graph 529 in a different database (e.g., a timeseries database). In some embodiments, the timeseries node 566 stores timeseries data (or any other type of data) for a data point of the VAV represented by the VAV node 516. The data of the timeseries node 564 can be inferred information, e.g., data inferred by one of the artificial intelligence agents 570 and written into the timeseries node 564 by the artificial intelligence agent 570. In some embodiments, the timeseries 564 and/or 566 are stored in the graph 529 but are stored as references to timeseries data stored in a timeseries database.

The twin manager 108 includes various software components. For example, the twin manager 108 includes a device management component 548 for managing devices of a building. The twin manager 108 includes a tenant management component 550 for managing various tenant subscriptions. The twin manager 108 includes an event routing component 552 for routing various events. The twin manager 108 includes an authentication and access component 554 for performing user and/or system authentication and grating the user and/or system access to various spaces, pieces of software, devices, etc. The twin manager 108 includes a commanding component 556 allowing a software application and/or user to send commands to physical devices. The twin manager 108 includes an entitlement component 558 that analyzes the entitlements of a user and/or system and grants the user and/or system abilities based on the entitlements. The twin manager 108 includes a telemetry component 560 that can receive telemetry data from physical systems and/or devices and ingest the telemetry data into the graph 529. Furthermore, the twin manager 108 includes an integrations component 562 allowing the twin manager 108 to integrate with other applications.

The twin manager 108 includes a gateway 506 and a twin connector 508. The gateway 506 can be configured to integrate with other systems and the twin connector 508 can be configured to allow the gateway 506 to integrate with the twin manager 108. The gateway 506 and/or the twin connector 508 can receive an entitlement request 502 and/or an inference request 504. The entitlement request 502 can be a request received from a system and/or a user requesting that an AI agent action be taken by the AI agent 570. The entitlement request 502 can be checked against entitlements for the system and/or user to verify that the action requested by the system and/or user is allowed for the user and/or system. The inference request 504 can be a request that the AI agent 570 generates an inference, e.g., a projection of information, a prediction of a future data measurement, an extrapolated data value, etc.

The cloud platform 106 is shown to receive a manual entitlement request 586. The request 586 can be received from a system, application, and/or user device (e.g., from the applications 110, the building subsystems 122, and/or the user device 176). The manual entitlement request 586 may be a request for the AI agent 570 to perform an action, e.g., an action that the requesting system and/or user has an entitlement for. The cloud platform 106 can receive the manual entitlement request 586 and check the manual entitlement request 586 against an entitlement database 584 storing a set of entitlements to verify that the requesting system has access to the user and/or system. The cloud platform 106, responsive to the manual entitlement request 586 being approved, can create a job for the AI agent 570 to perform. The created job can be added to a job request topic 580 of a set of topics 578.

The job request topic 580 can be fed to AI agents 570. For example, the topics 580 can be fanned out to various AI agents 570 based on the AI agent that each of the topics 580 pertains to (e.g., based on an identifier that identifies an agent and is included in each job of the topic 580). The AI agents 570 include a service client 572, a connector 574, and a model 576. The model 576 can be loaded into the AI agent 570 from a set of AI models stored in the AI model storage 568. The AI model storage 568 can store models for making energy load predictions for a building, weather forecasting models for predicting a weather forecast, action/decision models to take certain actions responsive to certain conditions being met, an occupancy model for predicting occupancy of a space and/or a building, etc. The models of the AI model storage 568 can be neural networks (e.g., convolutional neural networks, recurrent neural networks, deep learning networks, etc.), decision trees, support vector machines, and/or any other type of artificial intelligence, machine learning, and/or deep learning category. In some embodiments, the models are rule based triggers and actions that include various parameters for setting a condition and defining an action.

The AI agent 570 can include triggers 595 and actions 597. The triggers 595 can be conditional rules that, when met, cause one or more of the actions 597. The triggers 595 can be executed based on information stored in the graph 529 and/or data received from the building subsystems 122. The actions 597 can be executed to determine commands, actions, and/or outputs. The output of the actions 597 can be stored in the graph 529 and/or communicated to the building subsystems 122.

The AI agent 570 can include a service client 572 that causes an instance of an AI agent to run. The instance can be hosted by the artificial intelligence service client 588. The client 588 can cause a client instance 592 to run and communicate with the AI agent 570 via a gateway 590. The client instance 592 can include a service application 594 that interfaces with a core algorithm 598 via a functional interface 596. The core algorithm 598 can run the model 576, e.g., train the model 576 and/or use the model 576 to make inferences and/or predictions.

In some embodiments, the core algorithm 598 can be configured to perform learning based on the graph 529. In some embodiments, the core algorithm 598 can read and/or analyze the nodes and relationships of the graph 529 to make decisions. In some embodiments, the core algorithm 598 can be configured to use telemetry data (e.g., the timeseries data 564) from the graph 529 to make inferences on and/or perform model learning. In some embodiments, the result of the inferences can be the timeseries 566. In some embodiments, the timeseries 564 is an input into the model 576 that predicts the timeseries 566.

Figure 6:
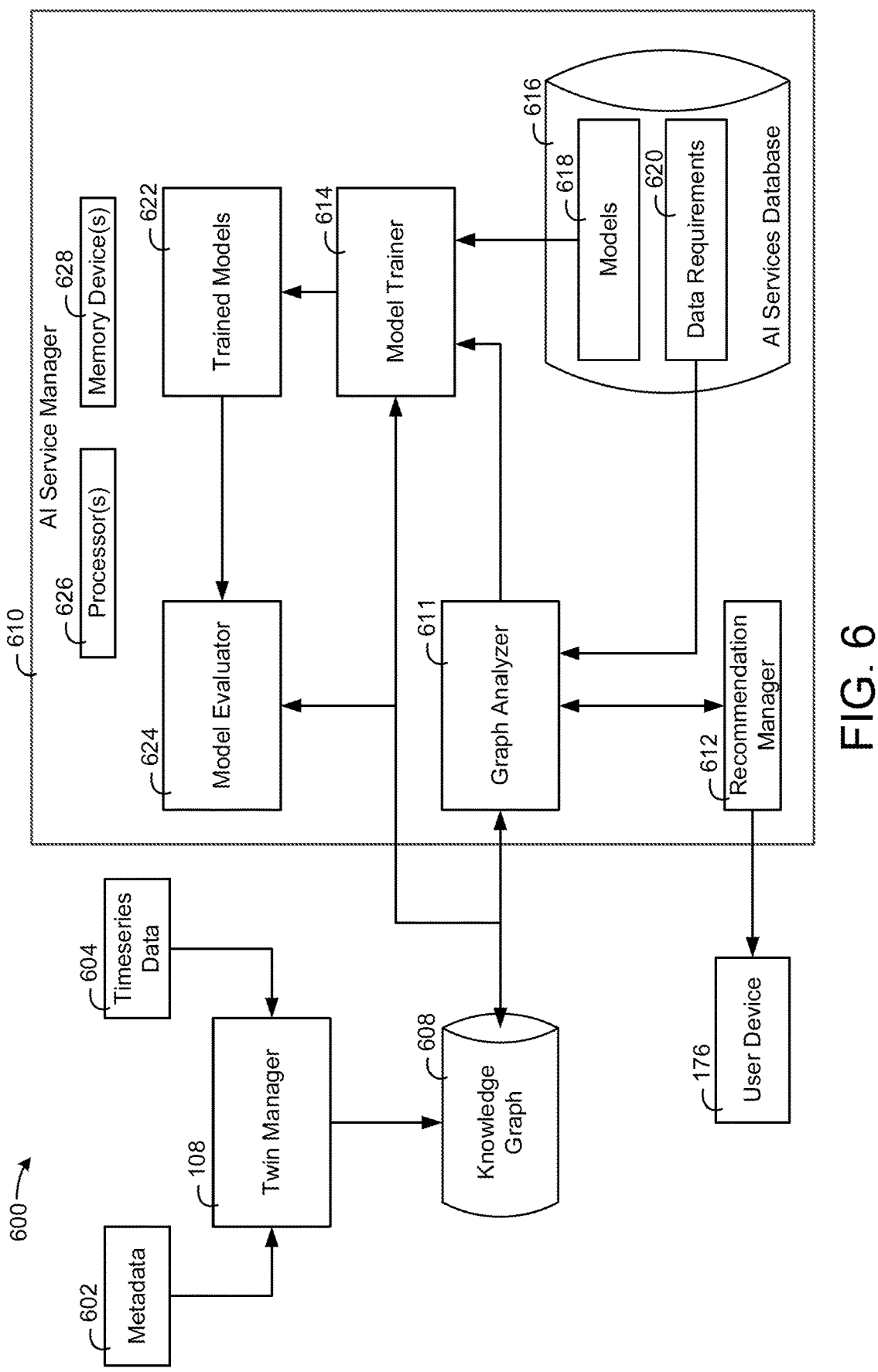
FIG. 6 is a block diagram of an artificial intelligence manager that determines whether an artificial intelligence service is appropriate for a building based on a knowledge graph, according to an exemplary embodiment.

Referring now to FIG. 6, a system 600, such as a building system, of an AI service manager 610 that determines whether an artificial intelligence service is appropriate for a building based on a knowledge graph 608 is shown, according to an exemplary embodiment. The AI service manager 610 includes processors 626 and memory devices 628. The AI service manager 610 can be a building system or a component of a building system. The processors 626 and the memory devices 628 can be the same as, or similar to, the processors and memory devices described with reference to FIG. 1. The AI service manager 610 can perform operations via the processors 626 based on instructions stored in the memory devices 628. The system 600, e.g., the AI service manager 610, can be implemented as components in the edge platform 102, the cloud platform 106, and the twin manager 108 or can be separate components that are in communication with the edge platform 102, the cloud platform 106, and/or the twin manager 108.

The AI service manager 610 can receive the knowledge graph 608 created, stored, and/or otherwise managed by the twin manager 108. The twin manager 108 can generate the knowledge graph 608 for a particular building based on metadata 602 received for the building and equipment of the building and the timeseries data 604 received from equipment of the building. Techniques for generating a knowledge graph from building data, which can be performed by the AI service manager 610, are described in U.S. patent application Ser. No. 16/663,623 filed Oct. 25, 2019, U.S. patent application Ser. No. 16/885,968 filed May 28, 2020, and U.S. patent application Ser. No. 16/885,959 filed May 28, 2020, the entireties of which are incorporated by reference herein.

In some embodiments, the knowledge graph 608 is a graph data structure. The knowledge graph 608 may utilize the BRICK schema, in some embodiments. The knowledge graph 608 can be similar to, or the same as, the graphs described with reference to FIGS. 1-5. The knowledge graph 608 can include nodes representing entities such as buildings, building spaces, equipment, data, events, data points, and/or data values. The knowledge graph 608 can include edges interrelating the nodes representing relationships between the entities. The edges can include words, sentence, and/or phrases that describe a type of relationship between two entities. The edges can include predicates and can form subject, predicate, and object (SPO) relationships between a node representing the subject and another node representing the object.

The AI service manager 610 includes a graph analyzer 611 that can analyze AI services of an AI services database 616 against the knowledge graph 608. The graph analyzer 611 can query the knowledge graph 608 for information and/or receive at least part of the knowledge graph 608. The graph analyzer 611 can receive data requirements 620 from the AI services database 616.

The data requirements 620 can be requirements that a particular model, e.g., the models 618 has to be properly trained and/or ran. The data requirements 620 can indicate types of data, types of entities (e.g., types of devices, types of spaces, etc.) necessary for a particular analytics solution to run properly. The graph analyzer 611 can receive the data requirements 620 from the AI services database 616 and determine whether the knowledge graph 608 stores the required data. In some embodiments, the models 618 require a certain configuration (e.g., a building must have a zone and a thermostat for a particular artificial intelligence service to run), value or data type (e.g., zone temperature, outdoor ambient temperature, etc.), and/or a certain amount of historical data for data points (e.g., needs at least a week of historical zone temperature and outdoor ambient temperature measurements).

In some embodiments, the data requirements 620 can include both required and recommend data points for analytics solution. In some embodiments, an analytics solution can run on a minimum level of data, e.g., required data points. However, additional data may increase the performance and may be included as recommend data points but not mandatory data points.

In some embodiments, the graph analyzer 611 can identify that substitute data is available in the knowledge graph 608 that may not meet the ideal requirements of the artificial intelligence services but would permit the artificial intelligence services to run. In this regard, the graph analyzer 611 can cause the artificial intelligence services to be trained and/or run based on the substitute data. The substitute data could be traffic data, crowd data, weather data, etc. In some embodiments, the graph analyzer 611 can identify that although required data for an artificial intelligence service is not stored in the knowledge graph 608, the AI service manager 610 could simulate the data from other information in the knowledge graph 608. In this regard, the graph analyzer 611 can cause the AI service manager 610 to train and/or otherwise implement the artificial intelligence service based on the simulated data.

In some embodiments, the graph analyzer 611 can identify data points needed for a particular artificial intelligence service based on the data requirements 620. The graph analyzer 611 can query the knowledge graph 608 for each required data point to verify that all of the data points needed for the artificial intelligence service are present and the appropriate amount of historical data is present. Responsive to determining that all required data points are present or appropriate substitutions and/or simulations are available to replace missing data points, the graph analyzer 611 can identify that the analytics solution can be trained and/or run.

The graph analyzer 611 could make a query for outdoor air temperature for a particular artificial intelligence service. The artificial intelligence service may require outdoor air temperature measured by an outdoor air temperature sensor. Whether a timeseries of historical outdoor air temperature measurements is present may be an optional requirement of the analytics solution. A query that the graph analyzer 611 could make on the knowledge graph 608 could be:

```
SELECT ?oat ?tsid
WHERE {
    ?oat a brick:Outside_Air Temperature_Sensor
    OPTIONAL {
        ?oat brick:timeseries [brick:hasTimeseriesId ?tsid]
    }
}
```

In some embodiments, the graph analyzer 611 can analyze each artificial intelligence service of the AI services database 616 to determine whether the analytics solution can run based on the existing information of the knowledge graph 608. In some embodiments, the graph analyzer 611 can present artificial intelligence services that have all (or at least a sufficient number) of their data requirements met or satisfied to a user device 176 via the recommendation manager 612. The recommendation manager 612 can cause a user interface to be displayed on the user device 176 allowing a user to accept and/or approve the analytics solutions causing them to be trained and/or implemented by the AI service manager 610.

In some embodiments, the recommendation manager 612 can provide recommendations to a user via the user device 176 recommending that the user install new sensors and/or pieces of equipment (e.g., an outdoor-air flow sensor, a flow controller, etc.) in a building so that data points needed for a particular artificial intelligence service are present and the analytics manager can run the particular artificial intelligence service. In some embodiments, the recommendation manager 612 can cause a user interface to be displayed on the user device 176 instructing the user to install the new sensor and/or piece of equipment or allowing the user to contact a technician and instruct them to install the new sensor and/or piece of equipment.

The graph analyzer 611 can provide an indication to the model trainer 614 that the data requirements 620 have been met and that a model of the models 618 associated with the data requirements 620 can be trained and/or implemented. The model trainer 614 can be configured to train the models 618 based on knowledge from the knowledge graph 608. In some embodiments, the model trainer 614 can run various optimization and/or learning algorithms (e.g., regressions, gradient descent, etc.) to train the models 618 based on the data of the knowledge graph 608. The models 618 can be neural networks (e.g., sequence to sequence neural networks, recurrent neural networks, convolutional neural networks, etc.), Decision Trees, Support Vector Machines, Bayesian networks, linear regression models, etc.

A model evaluator 624 can evaluate the trained models 622 and determine performance metrics based on the trained models 622. For example, if the trained models 622 predict a future value of a data point, the model evaluator 624 could retrieve the data value once it is measured and compare the actual data value against the predicted data value. As data is added to the knowledge graph 608 by the twin manager 108, the model evaluator 624 can retrieve the measured data from the knowledge graph 608 and compare the actual data values against predictions made by the trained models 622. The result of the evaluation by the model evaluator 624 could be accuracy and/or precision metrics. In some embodiments, the recommendation manager 612 can present evaluation metrics determined by the model evaluator 624 to the user via the user device 176 (e.g., via a user interface).

Figure 7:
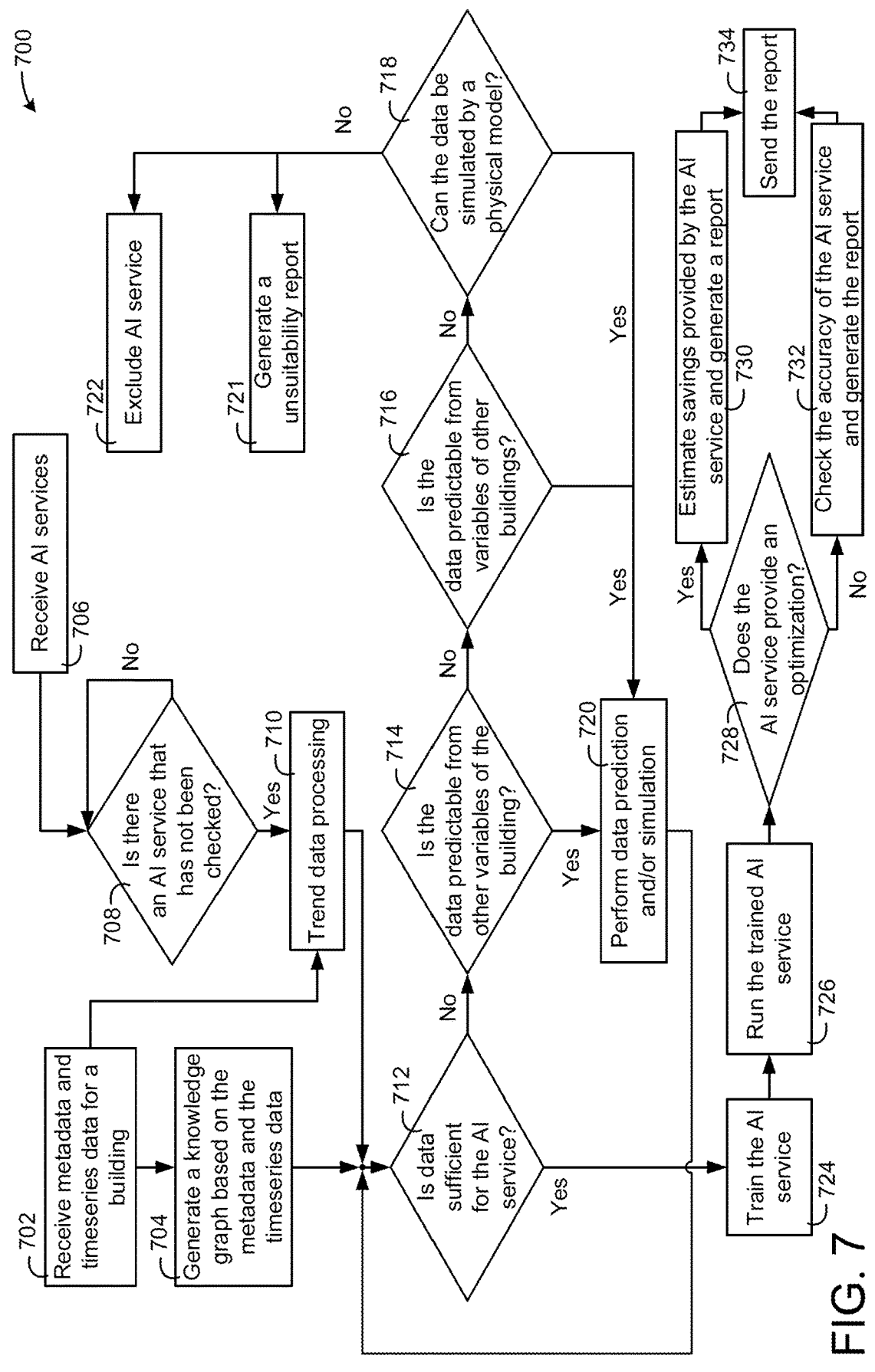
FIG. 7 is a flow diagram of a process of determining whether an artificial intelligence service is appropriate for a building based on the knowledge graph, according to an exemplary embodiment.

Referring now to FIG. 7, a process 700 of determining whether an artificial intelligence service is appropriate for a building based on the knowledge graph 608 is shown, according to an exemplary embodiment. The process 700 can be performed by the twin manager 108 and/or the AI service manager 610. Furthermore, any computing system, component, and/or device described herein can be configured to perform the process 700, in some embodiments. While the process 700 is described with reference to determining whether one artificial intelligence service is applicable to run, the process 700 can be repeated to determine whether multiple different artificial intelligence services can be implemented for a particular building. Each of the AI services can include different requirements, e.g., different required equipment, parameters, measurements, trend data length, and/or data measurement intervals. The process 700 can be performed for each analytics service with the appropriate requirements.

In step 702, the twin manager 108 can receive metadata and timeseries data for a building, e.g., the metadata 602 and the timeseries data 604. The metadata can include information such as floor plan drawings, HVAC system drawings, building information model (BIM) data, building automation system (BAS) data, etc. The timeseries data can include data point variables (e.g., sensor measurements, configuration settings, actuator commands, etc.) and/or various trends of the data point variables. The data point variables can be data points of various different subsystems installed in the building.

In step 704, the twin manager 108 can generate the knowledge graph 608 based on the received data of the step 702. The knowledge graph 608 can be the same as, or similar to, the graph data structures described with reference to FIGS. 1-5. The knowledge graph 608 can be a BRICK model and/or utilize the BRICK schema.

In step 706, the AI service manager 610 can receive an AI service, e.g., from the AI services database 616. In step 708, the AI service manager 610 can determine if there are any AI services that have not been checked by the AI service manager 610. In response to determining that the analytics service has not yet been checked, the process can continue to step 710. Responsive to determining that there are not any AI services that have not been checked by the AI service manager 610, the AI service manager 610 can wait until a new analytics service needs to be checked.

In step 710, the AI service manager 610 can perform trend data processing, e.g., getting data requirements for an analytics service to be checked, performing resampling on the timeseries data, removing outlier data in the timeseries data, perform interpolation on the timeseries data, performing consolidation on the timeseries data, etc.

In step 712, the AI service manager 610 can determine whether the data available in the knowledge graph 608 and/or the timeseries data 604 is sufficient for the analytics service to be trained and/or implemented. The AI service manager 610 can perform a knowledge graph suitability search on the knowledge graph 608 to determine whether the knowledge graph 608 is suitable for the analytics service. Furthermore, the AI service manager 610 can perform a trend data suitability check to determine whether the trended data of the trend data processing of step 710 is suitable for the analytics service. If the data is not sufficient, the process can proceed to step 714. If the data is sufficient, the process 700 can proceed to the step 720.

In step 714, the AI service manager 610 can determine whether the required data is predictable from other variables of the building. For example, in some embodiments, data that is missing from the knowledge graph 608 and/or the timeseries data 604 can be predicted from other data points. For example, if a third floor of a building does not have occupancy sensors but an occupancy level of the third floor is needed for a control algorithm, the occupancy of the third floor could be predicted by averaging the occupancy from the first floor, the second floor, and the fourth floor. If the data cannot be predicted, the process can proceed to the step 716. If the data can be predicted, the process can proceed to the step 720.

In step 716, the AI service manager 610 can determine whether the data can be predicted from variables of other buildings. For example, if the required data is a water consumption data point but the building does not have any sensor to measure water usage by the building, the AI service manager 610 could identify a building of a similar size with a similar number of occupants (e.g., via searching a database of buildings and pieces of building information, e.g., the knowledge graph 529) that does have sensors to measure water usage. The AI service manager 610 could predict the water usage for the building based on the water usage measured for the other building. If the data can be predicted from other buildings, the process 700 can proceed to the step 720. If the data cannot be predicted, the process 700 can proceed to the step 718. In some embodiments, an AI model may require one year of data to train and/or execute but a site that the AI model is being implemented for may only have a few months of data. In some embodiments, data from a similar building could be used to build a dataset to use for the AI model until the full year of data for the site is collected. In some embodiments, both building sites are owned by the same entity and/or built by the same entity.

In step 718, the AI service manager 610 can determine whether the data can be simulated by a physical model. For example, if the required data point is an electric load data point but there are no load sensors in the building, the AI service manager 610 could simulate an electric load of the building based on the number and type of building equipment that are operating in the building. The AI service manager 610 can store a repository of physical model simulation software which simulate various data points. The AI service manager 610 can consult the repository and select an appropriate physical model simulation software if it exists in the repository. If the data can be simulated the process 700 proceeds to the step 720. If the data cannot be simulated the process 700 can proceed to the steps 721 and 722.

In step 720, the AI service manager 610 can predict the data (e.g., the prediction of the steps 714 and 716) or simulate the data (e.g., the simulation of the step 718). In step 721, the analytics manager can generate an unsuitability report. The unsuitability report can indicate why the artificial intelligence service cannot be implemented. The unsuitability report can include a data quality score indicating a level or percentage of required data that has been met for the artificial intelligence service. Furthermore, the unsuitability report can indicate suggestions for installing equipment or devices (e.g., sensors) in the building in order to provide data that would enable the artificial intelligence service to run. In step 722, the artificial intelligence service can be excluded from running and/or can be added to an exclusion list and/or flagged as unsuitable by the AI service manager 610.

In step 724, the AI service manager 610 can train the artificial intelligence service to run. In some embodiments, the AI service manager 610 can train a model of the artificial intelligence service, e.g., the models 618. The AI service manager 610 can train and tune parameters of the model, in some embodiments. In some embodiments, the artificial intelligence service is trained by the AI service manager 610 based on the received metadata and/or timeseries data of the step 702 and/or the knowledge graph 608.

In step 726, the AI service manager 610 can run the trained artificial intelligence service. For example, if the artificial intelligence service is a control algorithm, the AI service manager 610 can run the control algorithm to control a physical pieces of equipment of a building. If the artificial intelligence service generates metrics or other information, the trained artificial intelligence service can run to generate the metrics or other information. If the artificial intelligence service predicts or infers information, the AI service manager 610 can run the trained artificial intelligence service to predict or infer the information. In some embodiments, the trained artificial intelligence service is run based on the received metadata and/or timeseries data of the step 702 and/or the knowledge graph 608. In some embodiments, the AI service manager 610 can run the trained artificial intelligence service for a predefined length of time.

In step 728, the AI service manager 610 can determine whether the trained artificial intelligence service provides an optimization. If the trained artificial intelligence service provides an optimization, the process 700 can proceed to step 730. If the trained artificial intelligence service does not provide an optimization, the process 700 can proceed to step 732. The AI service manager 610 can check the value of the trained artificial intelligence service and/or can select the appropriate value metrics based on the type of the artificial intelligence service.

In step 730, the AI service manager 610 can estimate the savings provided by the artificial intelligence service and generate a report to include and/or cause the report to include an indication of the estimated savings. The AI service manager 610 can determine how much energy or money has been saved based on an optimization run by the artificial intelligence service. For example, if the artificial intelligence service runs to optimize chiller, boiler, and/or AHU control, the resulting energy savings and/or comfort can be quantified and presented to the user in the report. Furthermore, if the AI service manager 610 is not set to run by a user, in some embodiments, the AI service manager 610 can identify an estimated savings if the AI service manager 610 had been run. For example, if the user has not enabled the service at a particular point in time, the AI service manager 610 could simulate the hypothetical performance of the building with and without the AI service manager 610 and include estimated savings in a report.

In step 732, the AI service manager 610 can check the accuracy of the analytics service and generate the report and/or cause the report to include the accuracy. For example, the AI service manager 610 can compare inferred and/or predicted values to actual values recorded by the building data platform 100. The AI service manager 610 can determine an average error between the predicted and/or inferred values and the actual values. In step 734, the AI service manager 610 can provide the report including the estimated monetary savings, estimated comfort improvement, the accuracy, and/or any other value metrics to a user via the user device. For example, cause a user interface of the user device 176 to display the report.

Figure 8:
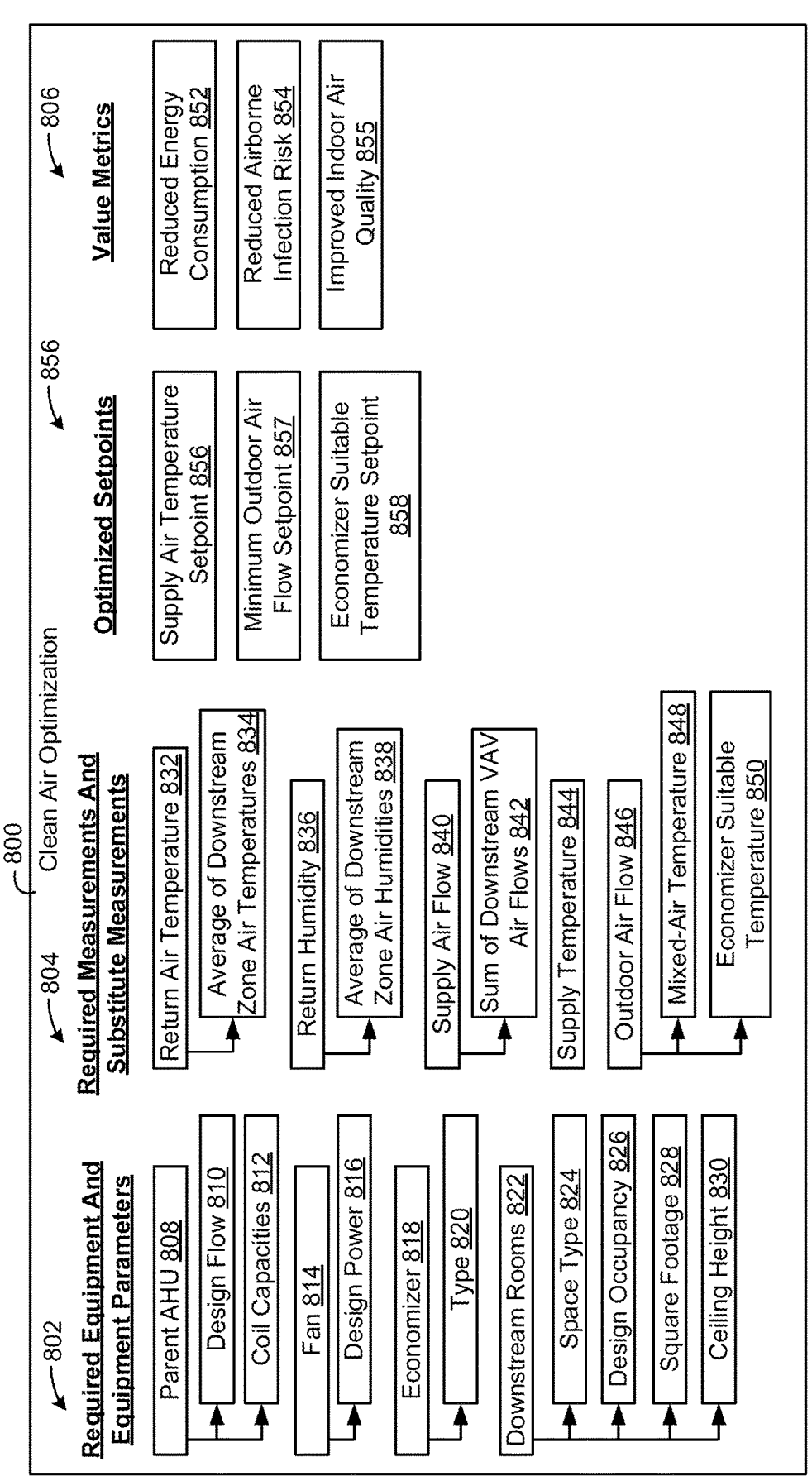
FIG. 8 is a block diagram of requirements and value metrics of a clean air optimization solution, according to an exemplary embodiment.

Referring now to FIG. 8, requirements and value metrics of a clean air optimization 800 are shown, according to an exemplary embodiment. The clean air optimization 800 can be an artificial intelligence service that is configured to analyze building information and make control decisions that optimize air quality and make the air clean. The clean air optimization 800 can be one of the artificial intelligence services of the AI services database 616, in some embodiments. The clean air optimization 800 can include one or more models, e.g., the models 618. The clean air optimization 800 can include data requirements 620, e.g., the requirements shown and described in FIG. 8. Furthermore, in some embodiments, the clean air optimization 800 may require configuration parameters and measurements but may not require model training.

The clean air optimization 800 includes requirements 802, e.g., required equipment and equipment parameters that are necessary to run the clean air optimization 800. The requirements 802 can indicate a parent AHU 808 that includes design flow 810 and coil capabilities 812. The design flow 810 could be particular air flow characteristics of the AHU and the coil capabilities 812 could indicate capabilities of a coil of the AHU.

The requirements 802 include a fan 814. The fan may be required to have a specific power requirement, e.g., the design power 816. The requirements 802 include an economizer 818 and a specific type 820 for the economizer 818. The requirements 802 include downstream rooms 822, e.g., rooms that are fed by air of the AHU. The downstream rooms may have specific requirements, e.g., the space type 824, design occupancy 826, square footage 828, and/or ceiling height 830.

The required measurements and substitute measurements 804 can be required data types that are measured for the specific building. The requirements 804 include return air temperature 832 which can be replaced with an average of downstream air temperatures 834 if the return air temperature of the AHU is unavailable. The AI service manager 610 can calculate the average of the downstream air temperatures if the knowledge graph 608 includes the downstream air temperatures but does not include a data point for the average of the downstream air temperatures.

The requirements 804 include return humidity 836. The return humidity 836 is the return humidity of the parent AHU 808. The requirements 804 include return humidity 836 which can be replaced with an average of downstream air humidities 838 if the return air humidity of the AHU is unavailable. The AI service manager 610 can calculate the average of the downstream air humidities if the knowledge graph 608 includes the downstream air humidities but does not include a data point for the average of the downstream air humidities.

The requirements 804 include supply air flow 840. The supply air flow 840 is the supply air flow of the parent AHU 808. The requirements 804 include supply air flow 840 which can be replaced with a sum of downstream VAV air flows 842 if the supply air flow of the AHU is unavailable. The AI service manager 610 can calculate the sum of the downstream VAV air flows if the knowledge graph 608 includes the downstream VAV air flows but does not include a data point for the average of the downstream VAV air flows.

The requirements 804 can include a supply temperature 844. The supply temperature 844 can be a data measurement type that is necessary and cannot be substituted for. The requirements 804 can include outdoor air flow 846. If the outdoor air flow 846 does not exist, the outdoor air flow 846 can be replaced with a mixed-air temperature 848 and/or economizer suitable temperature 850. Optimized setpoints 856 can be produced by the clean air optimization 800. The setpoints 856 can include a supply air temperature setpoint 856, a minimum outdoor air flow setpoint 857, and/or an economizer suitable temperatures setpoint 858.

The clean air optimization 800 can generate value metrics 806. Alternatively, the AI service manager 610 can generate the value metrics 806 for the clean air optimization 800. The value metrics 806 can include a reduced energy consumption 852 indicating how much energy consumption of the building has been reduced based on the clean air optimization 800. The value metrics 806 can include a reduced airborne infection risk 854. The reduced airborne infection risk 854 can indicate a level of which airborne infection risk has been reduced by the clean air optimization 800. The value metrics 806 can indicate an improved indoor air quality 855. The improved indoor air quality 855 can indicate how well indoor air quality has been improved, e.g., how well particulate, carbon dioxide, volatile organic compounds, etc. have been reduced. The value metrics 806 can generally indicate energy consumption, infection risk level, and/or indoor air quality.

Referring now to FIG. 9, requirements and value metrics of an energy prediction model 900 are shown, according to an exemplary embodiment. The energy prediction model 900 can be an artificial intelligence service of the AI services database 616. The energy prediction model 900 can be a model of the models 618 and can include data requirements 620. The energy prediction model 900 can require configuration parameters and measurements. In some embodiments, the energy prediction model 900 may need to be trained by the AI service manager 610 before being implemented. The AI service manager 610 can use existing energy prediction models for similar buildings as a starting point to reduce the amount of training data required to train the energy prediction model 900.

The energy prediction model 900 can include requirements 902 indicating required equipment and/or equipment parameters for the energy prediction model 900. The requirements 902 can include a parent energy meter 908. The equipment can further indicate a specific forecast frequency 910 of the parent energy meter 908. The energy prediction model 900 can have requirements 904 for measurements and substitute measurements. The requirements 904 can include an energy meter reading 912 for reading the parent energy meter. Furthermore, the requirements 904 can include an occupancy schedule 914 indicating an occupancy schedule for a building and/or part of a building. In some embodiments, the requirements 914 further includes a weather forecast 918 (e.g., forecast of outdoor temperature or forecast of outdoor humidity). A historian log of measurements of outdoor air temperature 920 and outdoor humidity measurements 922 can be used to estimate forecasted outdoor temperature or humidity, in some embodiments, when the weather forecast 918 is not available. In some embodiments, the energy prediction model 900 can generate optimized analytics 918, e.g., time-varying energy consumption 924 and/or predicted peak energy demand 926. The energy prediction model 900 includes value metrics 906. The value metrics 906 include an energy prediction accuracy metrics 916 indicating how accurate the energy predictions of the energy prediction model 900 are.

Figure 10:
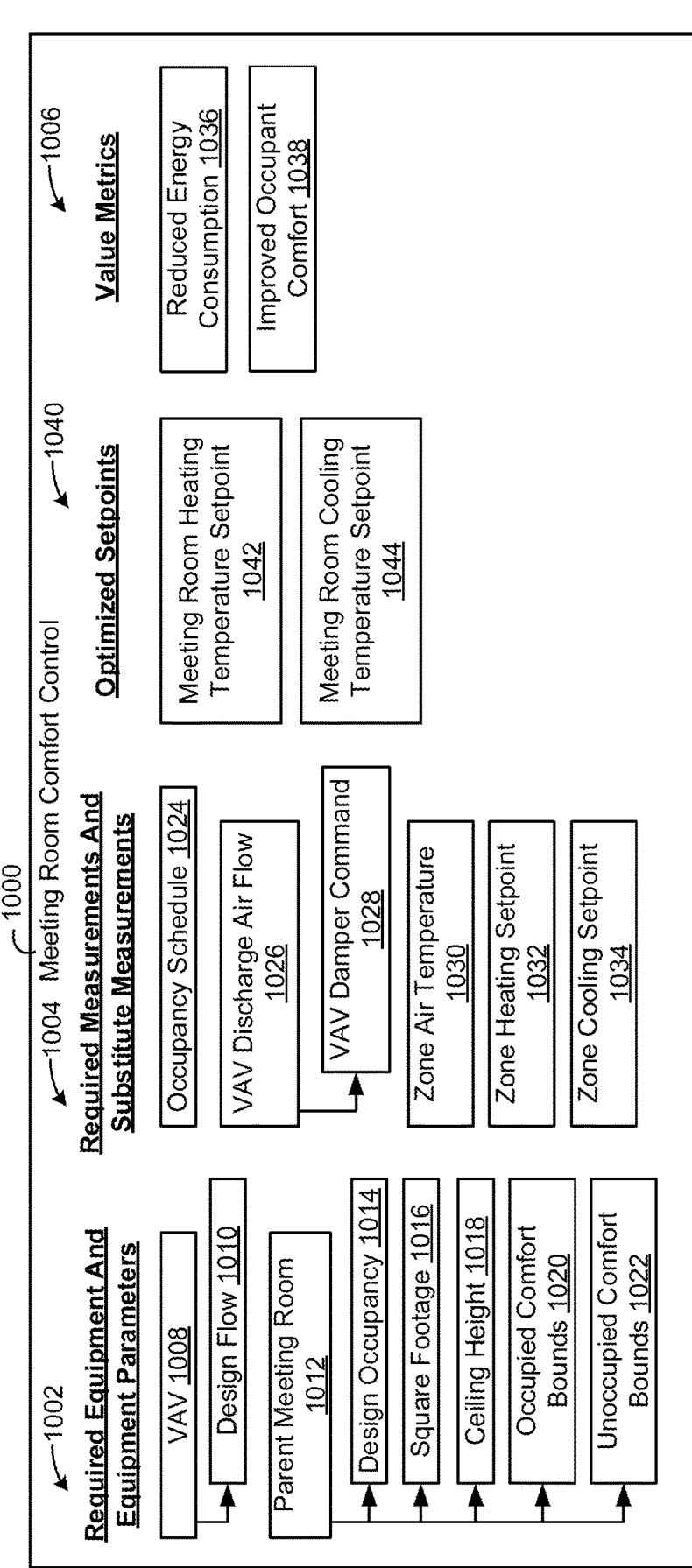
FIG. 10 is a block diagram of requirements and value metrics of a meeting room comfort control solution, according to an exemplary embodiment.

Referring now to FIG. 10, requirements and value metrics of a meeting room comfort control 1000 are shown, according to an exemplary embodiment. The meeting room comfort control 1000 can be an artificial intelligence service of the AI services database 616. The meeting room comfort control 1000 can be a model of the models 618 and can include data requirements 620. The AI service manager 610 can implement a rule-based policy for an initial suitability check of the meeting room comfort control 1000. The AI service manager 610 can determine which rooms would benefit (or benefit in at least a particular amount) from having the meeting room comfort control 1000 implemented. The AI service manager 610 can train the meeting room comfort control 1000 for specific rooms of a building.

The meeting room comfort control 1000 include requirements, e.g., the required equipment and equipment parameters 1002. The required equipment and equipment parameters 1002 include a VAV 1008. The VAV 1008 may have a specific design flow 1010. Furthermore, the requirements 1002 include a parent meeting room 1012. The parent meeting room 1012 may have required characteristics such as design occupancy 1014 (e.g., how many occupants the meeting room can safely hold), square footage 1016, ceiling height 1018, occupied comfort bounds 1020 (e.g., upper and/or lower temperature and/or humidity for the room when it is occupied), and/or unoccupied comfort bounds 1022 (e.g., upper and/or lower temperature and/or humidity for the room when it is unoccupied).

The requirements 1004 can indicate required measurements and substitute measurements for the meeting room comfort control 1000. The requirements 1004 can include an occupancy schedule 1024. The requirements 1004 can indicate a VAV discharge air flow 1026. The VAV discharge air flow 1026 can have a substitute, e.g., VAV damper command 1028. The requirements 1004 further indicate a zone air temperature 1030. The requirements 1004 indicate a zone heating setpoint 1032, in some embodiments. The requirements 1004 indicate a zone cooling setpoint 1034, in some embodiments. Optimized setpoints 1040 indicate setpoints determined by the meeting room comfort control 1000. The setpoints 1040 include a meeting room heating temperature setpoint 1042 and a meeting room cooling temperature setpoint 1044 for a meeting room.

The meeting room comfort control 1000 can generate value metrics 1006. Alternatively, the AI service manager 610 can generate the value metrics 1006 for the meeting room comfort control 1000. The value metrics 1006 can include a reduced energy consumption 1036 indicating how much energy consumption of the building has been reduced based on the meeting room comfort control 1000. The value metrics 1006 can indicate an improved occupant comfort 1038. The improved occupant comfort 1038 can indicate how well occupant comfort has been improved. The value metrics 1006 can generally indicate energy consumption, occupant comfort, and/or various other metrics.

Referring now to FIG. 11, a process 1100 of checking requirements of an artificial intelligence service against the knowledge graph 608 to determine whether the artificial intelligence service can be implemented for a particular building is shown, according to an exemplary embodiment. The process 1100 can be performed by the AI service manager 610. The process 1100 can be performed by any computing system or device as described herein.

In some embodiments, the knowledge graph 608 can include parent and/or child entities (e.g., nodes of particular types) which may be BRICK classes or other schema classes. The AI service manager 610 can search the knowledge graph 608 for specific instances of classes within the knowledge graph 608. The AI service manager 610 can search the knowledge graph 608 with various queries, e.g., SPARQL queries.

In step 1102, the AI service manager 610 can identify artificial intelligence service inputs required for an artificial intelligence service. The inputs can include parent entities, child entities, and/or substitute child entity mappings. The parent entities could include an AHU. The child entities could include a VAV that is fed by the AHU. Another child entity could be a zone that the VAV manages. Another child entity could be a zone temperature of the zone. The substitute child entities can be child entities that can be substituted for required child entities. The requirements of parent entities, required child entities, and substitute child entities can be the same as or similar to the requirements described in FIGS. 6-10.

In step 1104, the AI service manager 610 can initialize an empty suitable instances list and an unsuitable instances list. The empty suitable instances list can be an indication of suitable instances of the knowledge graph 608 for implementing the artificial intelligence service. The unsuitable instances list can indicate instances of the knowledge graph 608 that the artificial intelligence service cannot be implemented for.

In step 1106, the AI service manager 610 can identify each instance of the parent entity of the space in the knowledge graph 608 and perform the steps 1108-1128. In step 1108, the AI service manager 610 can initialize an empty missing entities list to store a list of missing child entities that are missing for the parent entity. In steps 1110-1112, the AI service manager 610 can search the knowledge graph 608 for the child entities. In step 1114, if the child entity is found, the process 1100 can proceed to step 1116. If the child entities are not found, the process 1100 proceeds to the step 1118. In step 1116, the AI service manager 610 can proceed to searching for the next child entity.

In step 1118, the AI service manager 610 can find a suitable substitute child entity if the original child entity is not present in the knowledge graph 608. The substitute child entities can be found by the AI service manager 610 by searching the knowledge graph 608. In some embodiments, multiple substitute child entities are found that, when combined in some manner (e.g., have values averaged or are used to infer another value), can act as a substitute for the missing child entity.

In step 1120, if a suitable child entity is found, the process 1100 will proceed to the step 1110. If the suitable child entity is not found, the process 1100 will proceed to the step 1122. In step 1122, the AI service manager 610 can add the missing child entity to the missing entities list. In step 1124, if the entities list is empty, the process 1100 can proceed to the step 1128. If the entities list is not empty, the process 1100 can proceed to the step 1126.

In step 1128, the AI service manager 610 can add the parent entity instance to the suitable instances list. In step 1126, the AI service manager 610 can add the parent entity instance to the unsuitable instances list. In step 1130, the AI service manager 610 can return the suitable instances list and/or the unsuitable instances list. In some embodiments, the AI service manager 610 can generate recommendations for implementing the analytics.

The recommendations can indicate levels of suitability of each of the artificial intelligence services (e.g., the number of child entities that need substitution). In some embodiment, the recommendations can include a list of available substitutions for child entities, the list can be prioritized. In some embodiments, the recommendations can indicate equipment or devices that could be installed in the building to measure pieces of information that would allow a particular artificial intelligence service to run.

Referring now to FIG. 12, a system 1200 including the clean air optimization 800 being checked against the knowledge graph 608 to determine whether the clean air optimization solution can be implemented is shown, according to an exemplary embodiment. In FIG. 12, the knowledge graph 608 includes nodes 1202-1246 and/or edges 1248-1292. The nodes 1202-1246 can be interrelated by the edges 1248-1292. The nodes 1202-1246 can represent entities, e.g., buildings, spaces, equipment, data points, characteristics, etc. The edges 1248-1292 can interrelate the entities.

The knowledge graph 608 includes a building 1202 that includes a first floor 1208 and a second floor 1204 indicated by the edges 1248 and 1250. The building 1202 further includes an electricity meter 1206 indicated by edge 1254. The floor 1208 includes an AHU 1222 indicated by edge 1257. The AHU 1222 includes an economizer 1210 indicated by edge 1258. The economizer 1210 includes an outdoor flow data point 1212 indicated by edge 1256. The AHU 1222 manages air for a room 1224 indicated by edge 1274. The room 1224 includes an occupancy data point 1226 indicated by edge 1276. The room 1224 further includes a square footage characteristic 1228 indicated by edge 1277. The floor 1208 can include the room 1224 indicated by the edge 1252 between the floor 1208 and the room 1224.

The AHU 1222 includes data points indicated by the nodes 1214-1220, i.e., a return humidity 1214, a supply flow 1216, a supply temperature 1218, and a return temperature 1220. The data points 1214-1220 are related to the AHU 1222 via the edges 1260-1266. Each of the data points can be measured via a sensor of the AHU 1222. The AHU 1222 serves a room 1231 indicated by edge 1270. The floor 1208 includes the room 1231 indicated by edge 1272. The room 1231 includes data points for occupancy and square footage, occupancy 1230 and square footage 1232. The data points are related to the room 1231 via the edges 1269 and 1268.

The floor 1204 is served by an AHU 1234 indicated by edge 1278. The floor 1204 includes a room 1236 indicated by edge 1280. The AHU 1234 serves the room 1236 indicated by edge 1286. The AHU 1234 includes data points supply flow 1238 and supply temperature 1240 indicated by edges 1282 and 1284. The room 1236 includes a characteristic square footage 1242 indicated by edge 1288. The room 1236 indicates data points zone temperature 1244 and zone humidity 1246 related to the room 1236 via edges 1290 and 1292. The zone temperature 1244 and zone humidity 1246 can be measured via sensors of the room 1236.

The knowledge graph 608 can be searched by the AI service manager 610 to identify parent entities that apply to the clean air optimization 800 and whether those parent entities include the proper child entities. The requirements for the clean air optimization 800 is described in greater detail in FIG. 8. The AI service manager 610 can identify the AHU 1222 and the AHU 1234 as potential targets (e.g., as the parent entities) for deploying the clean air optimization 800. However, the dependent child entities of the AHU 1222 can meet the requirements of the clean air optimization 800 while the AHU 1234 may not have dependent child entities meeting those requirements.

For example, the AI service manager 610 can identify the AHU 1222 as a required parent AHU 808. The AI service manager 610 can identify edges between the AHU 1222 and other nodes that indicate whether required measurements 804 are met by the AHU represented by AHU 1222. For example, the AI service manager 610 can determine whether the return air temperature requirement 832 is met. The AI service manager 610 can identify the edge 1266 relating the AHU 1222 to the return temperature node 1220. Responsive to identifying the edge 1266 between the AHU 1222 and the return temperature node 1220, the AI service manager 610 can determine that the requirement 832 is met.

The AI service manager 610 can determine if the return humidity requirement 836 is met by the AHU represented by the AHU 1222. The AI service manager 610 can identify the edge 1260 relating the AHU 1222 to the return humidity node 1214. Responsive to identifying the edge 1260 between the AHU 1222 and the return humidity node 1214, the AI service manager 610 can determine that the return humidity requirement 836 is met.

The AI service manager 610 can determine if the supply air flow requirement 840 is met by the AHU represented by the AHU 1222. The AI service manager 610 can identify the edge 1262 relating the AHU 1222 to the supply flow node 1216. Responsive to identifying the edge 1262 between the AHU 1222 and the supply flow node 1216, the AI service manager 610 can determine that the supply air flow requirement 840 is met.

The AI service manager 610 can determine if the supply temperature requirement 844 is met by the AHU represented by the AHU 1222. The AI service manager 610 can identify the edge 1264 relating the AHU 1222 to the supply temperature node 1218. Responsive to identifying the edge 1264 between the AHU 1222 and the supply temperature node 1218, the AI service manager 610 can determine that the supply temperature requirement 844 is met.

The AI service manager 610 can determine if the outdoor air flow requirement 846 is met by the AHU represented by the AHU 1222. The AI service manager 610 can identify the edge 1258 relating the AHU 1222 to the economizer node 1210 and the edge 1256 relating the economizer node 1210 to the outdoor flow node 1212. Responsive to identifying the edges 1258 between the AHU 1222 and the economizer 1210 and the edge 1256 between the economizer node 1210 and the outdoor flow node 1212, the AI service manager 610 can determine that the outdoor air flow requirement 846 is met. Responsive to determining that all of the requirements 804 are satisfied or met (and responsive to determine that the requirements 802 are satisfied or met), the AI service manager 610 can determine that the clean air optimization 800 can be implemented for the AHU 1222.

Furthermore, the AI service manager 610 can identify the AHU 1234 as a required parent AHU 808. The AI service manager 610 can identify edges between the AHU 1234 and other nodes that indicate whether required measurements 804 are met by the AHU represented by AHU 1234. For example, the AI service manager 610 can determine if the return air temperature requirement 832 is met by the AHU represented by the AHU 1234. The AI service manager 610 can determine that there is no node representing return air temperature related to the AHU 1234. Responsive to determining that the requirement 832 is not satisfied, the AI service manager 610 can determine whether a substitute requirement 834, indicating that an average of downstream zone air temperatures can be substituted for the return air temperature 832, is satisfied by the AHU 1234. The AI service manager 610 can identify an edge 1286 between the AHU 1234 and the room 1236. The AI service manager 610 can identify an edge 1290 between the room 1236 and the zone temperature node 1244. The AI service manager 610 can determine that the zone temperature represented by the zone temperature node 1244 alone, or averaged with other zone temperature readings, can substitute for the return air temperature responsive to identifying the edge 1286 between the AHU 1234 and the room 1236 and responsive to identifying the edge 1290 between the room 1236 and the zone temperature 1244.

The AI service manager 610 can determine if the return humidity requirement 836 is met by the AHU represented by the AHU 1234. The AI service manager 610 can determine that there is no node representing return humidity related to the AHU 1234. Responsive to determining that the requirement 836 is not satisfied, the AI service manager 610 can determine whether a substitute requirement 838, indicating that an average of downstream zone air humidities can be substituted for the return humidity, is satisfied by the AHU 1234. The AI service manager 610 can identify an edge 1286 between the AHU 1234 and the room 1236. The AI service manager 610 can identify an edge 1292 between the room 1236 and the zone humidity node 1246. The AI service manager 610 can determine that the zone humidity represented by the zone humidity node 1246 alone, or averaged with other zone humidity readings, can substitute for the return humidity responsive to identifying the edge 1286 between the AHU 1234 and the room 1236 and responsive to identifying the edge 1292 between the room 1236 and the zone humidity 1246.

The AI service manager 610 can determine whether the AHU 1234 meets the supply temperature requirement 844. The AI service manager 610 can identify the edge 1282 between the AHU 1234 and the supply temperature node

1240. The AI service manager 610 can determine whether the AHU 1234 meets the outdoor air flow requirement 846. The AI service manager 610 can search the nodes and edges related to the AHU node 1234 to see if the AHU 1234 is related to a node representing outdoor air flow. However, the AI service manager 610 may determine that the AHU 1234 does not have an outdoor air flow measurement or sensor system. Responsive to determining that the AHU 1234 does not have an outdoor air flow measurement, the AI service manager 610 can check the substitute requirements 848 and 850. The AI service manager 610 can determine whether the AHU 1234 includes a mixed-air temperature by searching nodes and edges linked to the AHU 1234. Responsive to identifying that none of the nodes or edges indicate that the AHU 1234 includes a mixed-air temperature measurement, the AI service manager 610 can determine whether the economizer suitable temperature requirement 850 is met. The AI service manager 610 can determine whether the AHU 1234 includes a economizer suitable temperature by searching nodes and edges linked to the AHU 1234. Responsive to determining that no nodes or edges linked to the AHU 1234 indicate that the AHU 1234 includes an economizer suitable temperature, the AI service manager 610 can determine that the AHU 1234 does not meet the requirement 850. Responsive to determining that the AHU 1234 does not meet the requirement 846 or the substitute requirements 848 and 850, the AI service manager 610 can determine that the clean air optimization 800 cannot be implemented for the AHU 1234. The AI service manager 610 can generate at least one recommendation to be surfaced to a user to install a sensor to measure outdoor air flow so that the clean air optimization 800 can be implemented for the AHU 1234.

Referring now to FIG. 13, a system 1300 including the energy prediction model 900 being checked against the knowledge graph to determine whether the energy prediction modeling solution can be implemented, according to an exemplary embodiment. The AI service manager 610 can identify that the energy prediction model 900 can be implemented for a building based on the knowledge graph 608 and the requirements of FIG. 9. The AI service manager 610 can identify that the energy prediction model 900 can be implemented for the electricity meter 1206, e.g., the parent entity for the energy prediction model 900.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

34

What is claimed:

1. A building system of a building comprising one or more non-transitory memory devices storing instructions thereon that, when executed by one or more processors, cause the one or more processors to:

store a digital twin comprising a knowledge graph including a plurality of nodes representing entities of the building and a plurality of edges between the plurality of nodes indicating relationships between the entities of the building;

receive a requirement to implement an artificial intelligence (AI) service, the requirement comprising:

an indication of a type of an entity, wherein the AI service is configured to generate an analytic for the entity of the type or a control setting for the entity of the type; and a data element that the AI service needs as an input to generate the analytic or the control setting;

determine that the building system meets the requirement to implement the AI service by searching the plurality of nodes and the plurality of edges to determine that a first node of the plurality of nodes represents the entity of the type and a second node, related to the first node by an edge of the plurality of edges, represents or includes the data element; and implement the AI service responsive to a determination that the building system meets the requirement.

2. The building system of claim 1, wherein the instructions cause the one or more processors to:

receive an indication of a metric indicating a level of performance of the AI service;

retrieve the data element from the digital twin; and generate a value of the metric indicating the level of performance of the AI service based on the data element.

3. The building system of claim 1, wherein:

the data element comprises a data value of equipment of the building;

the AI service includes a model configured to generate, based on the data value, the analytic for the entity of the type or the control setting for the entity of the type.

4. The building system of claim 1, wherein the instructions cause the one or more processors to:

determine that the AI service does not meet the requirement;

identify one or more equipment updates for the building, the one or more equipment updates including installing equipment in the building, the equipment producing the data element; and generate a recommendation including the one or more equipment updates for the building.

5. The building system of claim 1, wherein the instructions cause the one or more processors to:

receive a second requirement for the AI service, the second requirement indicating one or more child entities dependent on the entity, wherein the entity is a parent entity; and determine that the building system meets the second requirement responsive to a determination that the digital twin includes the parent entity and the one or more child entities dependent on the parent entity.

6. The building system of claim 1, wherein:

the data element includes at least one of a characteristic of the entity of the building or a data point of the entity of the building.

7. The building system of claim 1, wherein the instructions cause the one or more processors to:

receive a substitute requirement for the AI service, the substitute requirement indicating one or more data elements that substitute for the data element;

determine that the digital twin includes the one or more data elements that substitute for the data element; and determine that the building system meets the substitute requirement to implement the AI service responsive to a determination that the digital twin of the building system includes the one or more data elements.

8. The building system of claim 7, wherein the instructions cause the one or more processors to:

determine that the building system meets the requirement to implement the AI service by:

determining that the digital twin includes the one or more data elements that substitute for the data element.

9. The building system of claim 7, wherein the instructions cause the one or more processors to determine that the building system meets the requirement to implement the AI service by:

determining that the data element can be derived from the one or more data elements of the digital twin.

10. The building system of claim 7, wherein the instructions cause the one or more processors to determine that the building system meets the substitute requirement to implement the AI service by:

determining that the data element can be derived from information of another building.

11. A method, comprising:

receiving, by one or more processing circuits, a requirement to implement an artificial intelligence (AI) service, the requirement comprising:

an indication of a type of an entity of a building, wherein the AI service is configured to generate an analytic for the entity of the type or a control setting for the entity of the type; and a data element that the AI service needs as an input to generate the analytic or the control setting;

determining, by the one or more processing circuits, that the one or more processing circuits meet the requirement to implement the AI service responsive to a determination that a digital twin of the building includes the entity of the type and the data element indicating that the data element is available for the AI service to use as the input;

implementing, by the one or more processing circuits, the AI service responsive to a determination that the one or more processing circuits meet the requirement;

determining, by the one or more processing circuits, that another AI service does not meet the requirement;

identifying, by the one or more processing circuits, one or more equipment updates for the building, the one or more equipment updates including installing equipment in the building, the equipment producing the data element; and generating, by the one or more processing circuits, a recommendation including the one or more equipment updates for the building.

12. The method of claim 11, wherein:

the data element comprises a data value of equipment of the building;

the AI service includes a model configured to generate, based on the data value, the analytic for the entity of the type or the control setting for entity of the type.

13. The method of claim 11, comprising:

receiving, by the one or more processing circuits, a second requirement for the AI service, the second requirement indicating one or more child entities dependent on the entity, wherein the entity is a parent entity; and determining, by the one or more processing circuits, that the one or more processing circuits meet the second requirement responsive to a determination that the digital twin includes the parent entity and the one or more child entities dependent on the parent entity.

14. The method of claim 11, wherein the digital twin is a knowledge graph including a plurality of nodes representing entities of the building and a plurality of edges between the plurality of nodes indicating relationships between the entities of the building;

the method comprising:

determining, by the one or more processing circuits, that the one or more processing circuits meet the requirement to implement the AI service by searching the plurality of nodes and the plurality of edges to determine that a first node of the plurality of nodes represents the entity of the type and a second node, related to the first node by an edge of the plurality of edges, represents or includes the data element.

15. The method of claim 11, comprising:

receiving, by the one or more processing circuits, a substitute requirement for the AI service, the substitute requirement indicating one or more data elements that substitute for the data element;

determining, by the one or more processing circuits, that the digital twin includes the one or more data elements that substitute for the data element; and determining, by the one or more processing circuits, that the one or more processing circuits meet the substitute requirement to implement the AI service responsive to a determination that the digital twin of the building includes the one or more data elements.

16. One or more non-transitory storage media storing instructions thereon, that, when executed by one or more processors, cause the one or more processors to:

receive a requirement to implement an artificial intelligence (AI) service, the requirement comprising:

an indication of a type of an entity of a building, wherein the AI service is configured to generate an analytic for the entity of the type or a control setting for the entity of the type; and a data element that the AI service needs as an input to generate the analytic or the control setting;

determine that the one or more processors meet the requirement to implement the AI service responsive to a determination that a digital twin of the building includes the entity of the type and the data element indicating that the data element is available for the AI service to use as the input;

receive a second requirement for the AI service, the second requirement indicating one or more child entities dependent on the entity, wherein the entity is a parent entity;

determine that the one or more processors meet the second requirement responsive to a determination that the digital twin includes the parent entity and the one or more child entities dependent on the parent entity; and implement the AI service responsive to a determination that the one or more processors meet the requirement and the second requirement.

17. The one or more non-transitory storage media of claim 16, wherein the instructions cause the one or more processors to:

determine that the AI service does not meet the requirement;

identify one or more equipment updates for the building, the one or more equipment updates including installing equipment in the building, the equipment producing the data element; and generate a recommendation including the one or more equipment updates for the building.

\* \* \* \* \*